United States Patent
Fleischmann et al.

(10) Patent No.: US 10,069,135 B2
(45) Date of Patent: *Sep. 4, 2018

(54) POLYMERS FOR USE AS PROTECTIVE LAYERS AND OTHER COMPONENTS IN ELECTROCHEMICAL CELLS

(71) Applicants: Sion Power Corporation, Tucson, AZ (US); BASF SE, Ludwigshafen (DE)

(72) Inventors: Sven Fleischmann, Ludwigshafen (DE); Tobias Petsch, Mörschied (DE); Andrea Misske, Speyer (DE); Ruediger Schmidt, Paderborn (DE); Veronika G. Viner, Tucson, AZ (US); Bala Sankaran, Tucson, AZ (US)

(73) Assignees: Sion Power Corporation, Tucson, AZ (US); BASF SE, Ludwigshafen (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/068,372

(22) Filed: Oct. 31, 2013

(65) Prior Publication Data

US 2014/0127419 A1   May 8, 2014

Related U.S. Application Data

(60) Provisional application No. 61/721,941, filed on Nov. 2, 2012, provisional application No. 61/790,879, filed on Mar. 15, 2013.

(51) Int. Cl.
*H01M 4/139* (2010.01)
*H01M 4/62* (2006.01)
(Continued)

(52) U.S. Cl.
CPC .......... *H01M 4/139* (2013.01); *H01M 2/145* (2013.01); *H01M 2/1653* (2013.01);
(Continued)

(58) Field of Classification Search
None
See application file for complete search history.

(56) References Cited

U.S. PATENT DOCUMENTS 4,954,371 A    9/1990  Yializis
5,681,615 A   10/1997  Affinito et al.
(Continued)

FOREIGN PATENT DOCUMENTS

DE    19830993 A1    1/2000
EP     1339127 A1    8/2003
(Continued)

OTHER PUBLICATIONS

Translation of DE19830993, Jan. 2000.*
(Continued)

*Primary Examiner* — Erma C Cameron
(74) *Attorney, Agent, or Firm* — Wolf, Greenfield & Sacks, P.C.

(57) ABSTRACT

Electrode structures and electrochemical cells are provided. The electrode structures and/or electrochemical cells described herein may include one or more protective layers comprising a polymer layer and/or a gel polymer electrolyte layer. The polymer layer may be formed from the copolymerization of an olefinic monomer comprising at least one electron withdrawing group and an olefinic comonomer comprising at least one electron donating group. Methods for forming polymer layers are also provided.

20 Claims, 3 Drawing Sheets

(51) Int. Cl.
*H01M 2/14* (2006.01)
*H01M 2/16* (2006.01)
*H01M 4/36* (2006.01)
*H01M 10/0565* (2010.01)
*H01M 4/13* (2010.01)

(52) U.S. Cl.
CPC ........... *H01M 4/366* (2013.01); *H01M 4/622* (2013.01); *H01M 4/628* (2013.01); *H01M 10/0565* (2013.01); *H01M 4/13* (2013.01); *H01M 2300/0085* (2013.01)

(56) References Cited

U.S. PATENT DOCUMENTS

| | | | | |
|---|---|---|---|---|
| 5,902,699 | A * | 5/1999 | Cocciantelli et al. | ........ 429/217 |
| 6,127,447 | A * | 10/2000 | Mitry | ........ C08F 2/50 427/517 |
| 7,066,971 | B1 * | 6/2006 | Carlson | ........ 29/623.5 |
| 7,247,408 | B2 | 7/2007 | Skotheim et al. | |
| 7,771,870 | B2 | 8/2010 | Affinito et al. | |
| 7,785,730 | B2 | 8/2010 | Affinito et al. | |
| 8,076,024 | B2 | 12/2011 | Affinito et al. | |
| 8,105,717 | B2 | 1/2012 | Skotheim et al. | |
| 8,197,971 | B2 | 6/2012 | Skotheim et al. | |
| 8,338,034 | B2 | 12/2012 | Affinito et al. | |
| 8,415,054 | B2 | 4/2013 | Skotheim et al. | |
| 8,603,680 | B2 | 12/2013 | Affinito et al. | |
| 8,617,748 | B2 | 12/2013 | Mikhaylik et al. | |
| 8,623,557 | B2 | 1/2014 | Skotheim et al. | |
| 8,728,661 | B2 | 5/2014 | Skotheim et al. | |
| 8,753,771 | B2 | 6/2014 | Skotheim et al. | |
| 8,871,387 | B2 | 10/2014 | Wang et al. | |
| 8,936,870 | B2 | 1/2015 | Affinito et al. | |
| 8,968,928 | B2 | 3/2015 | Wang et al. | |
| 9,005,311 | B2 | 4/2015 | Safont-Sempere et al. | |
| 9,040,197 | B2 | 5/2015 | Affinito et al. | |
| 9,040,201 | B2 | 5/2015 | Affinito et al. | |
| 9,065,149 | B2 | 6/2015 | Skotheim et al. | |
| 2002/0012846 | A1 | 1/2002 | Skotheim et al. | |
| 2004/0044094 | A1 * | 3/2004 | Garnett | ........ C08F 2/46 522/1 |
| 2005/0288467 | A1 * | 12/2005 | Satou | ........ C08F 226/02 526/313 |
| 2006/0222954 | A1 | 10/2006 | Skotheim et al. | |
| 2007/0141461 | A1 | 6/2007 | Lin et al. | |
| 2007/0224502 | A1 * | 9/2007 | Affinito et al. | ........ 429/209 |
| 2008/0014501 | A1 | 1/2008 | Skotheim et al. | |
| 2008/0057397 | A1 | 3/2008 | Skotheim et al. | |
| 2008/0213672 | A1 | 9/2008 | Skotheim et al. | |
| 2008/0214685 | A1 * | 9/2008 | Niitani | ........ C08F 12/32 521/27 |
| 2009/0280410 | A1 | 11/2009 | Zaguib et al. | |
| 2009/0291353 | A1 | 11/2009 | Affinito et al. | |
| 2010/0129699 | A1 | 5/2010 | Mikhaylik et al. | |
| 2010/0233537 | A1 | 9/2010 | Nesvadba et al. | |
| 2010/0291442 | A1 | 11/2010 | Wang et al. | |
| 2010/0327811 | A1 | 12/2010 | Affinito et al. | |
| 2011/0068001 | A1 | 3/2011 | Affinito et al. | |
| 2011/0070481 | A1 * | 3/2011 | Liang | ........ C09D 133/06 429/163 |
| 2011/0177398 | A1 | 7/2011 | Affinito et al. | |
| 2012/0043940 | A1 | 2/2012 | Affinito et al. | |
| 2012/0052397 | A1 | 3/2012 | Mikhaylik et al. | |
| 2012/0244427 | A1 * | 9/2012 | Hashimoto | ........ C08F 16/14 429/200 |
| 2012/0276449 | A1 | 11/2012 | Skotheim et al. | |
| 2013/0017441 | A1 | 1/2013 | Affinito et al. | |
| 2013/0095380 | A1 | 4/2013 | Affinito et al. | |
| 2013/0143096 | A1 | 6/2013 | Affinito et al. | |
| 2013/0216915 | A1 | 8/2013 | Affinito et al. | |
| 2013/0280605 | A1 | 10/2013 | Affinito et al. | |
| 2014/0045075 | A1 | 2/2014 | Skotheim et al. | |
| 2014/0062411 | A1 | 3/2014 | Mikhaylik et al. | |
| 2014/0072873 | A1 | 3/2014 | Wang et al. | |
| 2014/0079994 | A1 | 3/2014 | Affinito et al. | |
| 2014/0123477 | A1 | 5/2014 | Safont-Sempere et al. | |
| 2014/0127577 | A1 * | 5/2014 | Fleischmann et al. | ....... 429/215 |
| 2014/0205912 | A1 | 7/2014 | Skotheim et al. | |
| 2014/0272565 | A1 | 9/2014 | Gronwald et al. | |
| 2014/0272594 | A1 | 9/2014 | Safont-Sempere et al. | |
| 2015/0010804 | A1 | 1/2015 | Laramie et al. | |
| 2015/0044517 | A1 | 2/2015 | Mikhaylik et al. | |
| 2015/0086837 | A1 | 3/2015 | Laramie et al. | |
| 2015/0162586 | A1 | 6/2015 | Fleischmann et al. | |
| 2015/0180037 | A1 | 6/2015 | Gronwald et al. | |

FOREIGN PATENT DOCUMENTS

| | | |
|---|---|---|
| JP | 2001-223027 A | 8/2001 |
| JP | 2005-129535 A | 5/2005 |
| JP | 2009-076433 A | 4/2009 |
| JP | 2011-168935 A | 9/2011 |

OTHER PUBLICATIONS

Decker et al, Macromol. Chem. Phys., 200(5), pp. 1005-1013, 1999.*
Hoyle et al, Photopolymerization, Chapter 11, pp. 133-149, Nov. 1997.*
Jonsson et al, Nuclear Instruments and Methods in Physics Research B 131, pp. 276-290, 1997.*
Kohli et al, Macromolecules, 31, pp. 5681-5689, 1998.*
Tsarik et al, Journal of Polymer Science: Part A: Polymer Chemistry 36, pp. 371-378, 1998.*
Barton et al, Journal of Polymer Science: Part A, 3, pp. 501-511, 1965.*
Reiche et al, Electrochimica Acta, 45, pp. 1327-1334, 2000.*
International Search Report and Written Opinion dated Mar. 11, 2014 for Application No. PCT/EP2013/072775.
International Preliminary Report on Patentability for PCT/EP2013/072775 completed Feb. 25, 2015.
Chen, Chapter 16: Diversified Classes of Enzyme Modulators. *Activation and Detoxification Enzymes: Functions and Implications.* 2011. Springer-Verlag, New York. pp. 155-165.
Foglia et al., Pseudohalogens. X. Effect of some electronic or steric factors on the addition of N,N-dichlorourethane to unsaturated compounds. *J Org Chem.* Feb. 1968;33(2):766-71.
Otsu, Structure and Polymerizability of Vinyl Monomers. Sen'i Gakkaishi, vol. 23 (1967) No. 11, pp. S323-S327, The Society of Fiber Science and Technology, Japan, https://www.jstage.jst.go.jp/article/fiber1944/23/11/23_11_S323/_article/-char/ja/.
Otsu, Structure and Reactivity of Monomers. Journal of Synthetic Organic Chemistry, Japan. 1970;28(12):1183-96.

* cited by examiner

POLYMERS FOR USE AS PROTECTIVE LAYERS AND OTHER COMPONENTS IN ELECTROCHEMICAL CELLS

RELATED APPLICATIONS

This application claims priority under 35 U.S.C. § 119(e) to U.S. Provisional Application Ser. No. 61/721,941, entitled, "Polymers for Use as Protective Layers and Other Components in Electrochemical Cells," filed on Nov. 2, 2012, and to U.S. Provisional Application Ser. No. 61/790,879, entitled, "Polymers for Use as Protective Layers and Other Components in Electrochemical Cells", filed on Mar. 15, 2013, each of which is incorporated herein by reference in its entirety for all purposes.

STATEMENT REGARDING FEDERALLY SPONSORED RESEARCH AND DEVELOPMENT

This invention was made with government support under Grant No. DE-AR0000067 awarded by the Department of Energy ARPA-E program (ARPA-E BEEST DE-FOA-00000207-1536). The government has certain rights in the invention.

FIELD OF INVENTION

The present invention relates to polymers for use as protective layers for electrode structures and/or other components in electrochemical cells.

BACKGROUND

A typical electrochemical cell has a cathode and an anode which participate in an electrochemical reaction. Some electrochemical cells (e.g., rechargeable batteries) may undergo a charge/discharge cycle involving stripping and deposition of metal (e.g., lithium metal) on the surface of the anode accompanied by parasitic reactions of the metal on the anode surface with other cell components (e.g., electrolyte components), wherein the metal can diffuse from the anode surface during discharge. The efficiency and uniformity of such processes can affect efficient functioning of the electrochemical cell. In some cases, one or more surfaces of one or more electrodes may become uneven as the electrochemical cell undergoes repeated charge/discharge cycles, often due to uneven redeposition of a reduced ion dissolved in the electrolyte. The roughening of one or more surfaces of one or more electrodes can result in increasingly poor cell performance.

Despite the various approaches proposed for forming electrodes and forming interfacial and/or protective layers, improvements are needed.

SUMMARY OF THE INVENTION

The present invention relates to electrode structures, and more specifically, to protective layers or other components (e.g., polymer gel layers or separators) for use in electrochemical cells. Electrochemical cells and other articles including such layers or components are also provided. The subject matter of the present invention involves, in some cases, interrelated products, alternative solutions to a particular problem, and/or a plurality of different uses of one or more systems and/or articles.

In one set of embodiments, an electrochemical cell is provided. In one embodiment, an electrochemical cell includes an electroactive layer and at least one polymer layer. The polymer layer is formed from the copolymerization of an olefinic monomer comprising at least one electron withdrawing group and an olefinic comonomer comprising at least one electron donating group.

In another embodiment, an electrochemical cell includes an electroactive layer and at least one polymer layer. The polymer layer is formed from the polymerization of an olefinic monomer having at least one electron withdrawing group and at least one electron donating group.

In another embodiment, an electrochemical cell includes an electroactive layer and at least one polymer layer. The at least one polymer layer is formed by copolymerization of a maleimide and a vinyl ether.

In another embodiment, an electrochemical cell comprises an electroactive layer and at least one layer comprising a polymer. The polymer is formed from: a) the copolymerization of at least one olefinic monomer comprising at least one electron withdrawing group attached to a double bond and at least one olefinic comonomer comprising at least one electron donating group attached to a double bond, or b) the polymerization of an olefinic monomer having at least two double bonds, at least one electron withdrawing group attached to one of the double bonds, and at least one electron donating group attached to another of the double bonds. The polymer includes structural units comprising the at least one electron withdrawing group that alternate with structural units comprising the at least one electron donating group.

In some embodiments involving the electrochemical cells described above and herein, the electron withdrawing group is selected from the group consisting of a haloalkyl, —CN, —COOR$_1$, —C(=O)R$_1$, —CON(R$_1$)$_2$, —CONR$_1$H, halogen, —NO$_2$, —SO$_3$R$_1$, —SO(OR$_1$)$_2$, —SO(OR$_1$)H, —SOR$_1$, —SO$_2$R$_1$, —PO(OR$_1$)$_2$, —PO(OR$_1$)H, and protonated amine groups, wherein two electron withdrawing groups attached in the 1,2-position to the double bond may form together with the double bond of a 5- to 6-membered substituted or unsubstituted, unsaturated cycle or heterocycle. Each occurrence of R$_1$ is independently selected from the group consisting of hydrogen; halogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; substituted or unsubstituted heteroaryl, substituted or unsubstituted, branched or unbranched alkylene oxide or poly(alkylene oxide); a metal ion, an anionic group, and a lithium-containing group. R$_1$ may be linked to at least one further electron donating or electron withdrawing group attached to an olefinic double bond.

Additionally, in some embodiments involving the electrochemical cells described above and herein, the electron donating group is selected from the group consisting of an alkylamino, a heteroaryl, a cycloalkyl, a cycloalkenyl, a cycloalkynyl, —OCOR$_2$, —NR$_2$COR$_2$, —OR$_2$, —SR$_2$, —Si(OR$_2$)$_3$, —Si(OR$_2$)$_2$H, —Si(OR$_2$)H$_2$, —Si(R$_2$)$_3$, —Si(R$_2$)$_2$H, —Si(R$_2$)H$_2$,

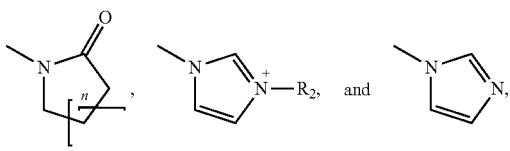

wherein each occurrence of $R_2$ is independently selected from the group consisting of hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; substituted or unsubstituted heteroaryl, substituted or unsubstituted, branched or unbranched alkylene oxide or poly(alkylene oxide); a metal ion; an anionic group, and a lithium-containing conducting group, and wherein n is 1, 2 or 3. $R_2$ may optionally be linked to at least one further electron donating or electron withdrawing group attached to an olefinic double bond.

In certain embodiments involving the electrochemical cells described above and herein, at least one of the olefinic monomers comprises at least two double bonds, wherein each double bond has attached thereto one or more electron donating groups or one or more electron withdrawing groups.

In certain embodiments involving the electrochemical cells described above and herein, the polymer is formed by copolymerization of at least one maleimide or maleic anhydride and at least one vinyl ether. In other embodiments, the polymer is formed by polymerization of an olefinic monomer including at least one maleimide or maleic anhydride and at least one vinyl ether.

In certain embodiments involving the electrochemical cells described above and herein, the olefinic monomer comprising the at least one electron withdrawing group is selected from the group consisting of

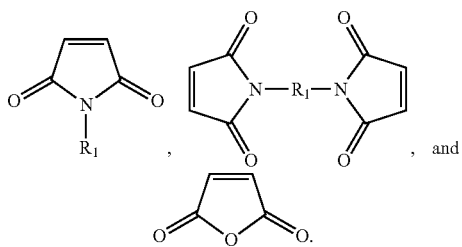

In certain embodiments involving the electrochemical cells described above and herein, the electron withdrawing group and/or the electron donating group comprises a cycloalkyl group, a cycloalkenyl group, or a cycloalkynyl group. In other embodiments, the electron withdrawing group and/or the electron donating group comprises a heteroaryl group; optionally, wherein the heteroaryl group comprises a nitrogen heteroatom, two nitrogen heteroatoms, or an oxygen heteroatom.

In certain embodiments involving the electrochemical cells described above and herein, the polymer comprises a substituted or unsubstituted, branched or unbranched poly(alkylene oxide); an anionic group; and/or a lithium-containing group; optionally, wherein the lithium-containing group is Aryl-$SO_3$Li or Alkyl-$SO_3$Li.

In some embodiments, $R_1$ and/or $R_2$ comprises a lithium ion and/or is conductive to lithium ions.

In some instances, the electroactive layer comprises an alkali metal (e.g., lithium metal).

In certain embodiments involving the electrochemical cells described above and herein, the Q-e scheme of the monomer comprising the at least one electron withdrawing group attached to the double bond is e>0 and Q<0.1 and the Q-e scheme of the comonomer comprising the at least one electron donating group attached to the double bond is e<0 a and Q>0.1. In other embodiments, the Q-e scheme of the monomer comprising the at least one electron withdrawing group attached to the double bond is e>0 and Q>0.1 and the Q-e scheme of the comonomer comprising the at least one electron donating group attached to the double bond is e<0 a and Q<0.1.

In certain embodiments involving the electrochemical cells described above and herein, a dry conductivity of the layer comprising the polymer is greater than $10^{-10}$ and less than or equal to $10^{-4}$ S/cm at room temperature.

In certain embodiments involving the electrochemical cells described above and herein, the layer comprising the polymer is a gel polymer electrolyte layer. In some embodiments, a conductivity of the gel polymer electrolyte layer is greater than $10^{-7}$ and less than or equal to $10^{-3}$ S/cm at room temperature when swollen by an electrolyte. In some cases, the gel polymer electrolyte layer is swollen with an electrolyte comprising at least one of dioxolane and dimethoxyethane.

In certain embodiments involving the electrochemical cells described above and herein, the electrochemical cell further comprises an ion conductive layer disposed between the electroactive layer and the layer comprising the polymer. In some embodiments, the electrochemical cell further comprises alternating layers of the at least one layer comprising the polymer and at least one ion conductive layer. In certain embodiments, the ion conductive layer comprises at least one of lithium nitride, lithium silicate, lithium borate, lithium aluminate, lithium phosphate, lithium phosphorus oxynitride, lithium silicosulfide, lithium germanosulfide, lithium oxides, lithium lanthanum oxides, lithium titanium oxides, lithium borosulfide, lithium aluminosulfide, and lithium phosphosulfide.

In certain embodiments involving the electrochemical cells described above and herein, the polymer further comprises a second comonomer adapted to tether the polymer to a substrate. In certain embodiments, the polymer comprises approximately 0.1 molar % to 20 molar % of the second comonomer. In some instances, the second comonomer comprises at least one of carboxylic acid, carboxylate, glycidyl, maleic anhydride, phosphonic acid ester, sulfonic acid, and sulfonic acid esters.

In certain embodiments involving the electrochemical cells described above and herein, the polymer comprises excess vinyl ether compared to maleimide, and the excess vinyl ether acts as a plasticizer.

In certain embodiments involving the electrochemical cells described above and herein, the polymer (or monomer(s)) comprises a lithium salt. In some embodiments, the lithium salt is intrinsic to the polymer. In other embodiments, the lithium salt is dissolved in an electrolyte to be used with the electrochemical cell. In yet other embodiments, the lithium salt is intrinsic to the polymer and is dissolved in an electrolyte to be used with the electrochemical cell. In some embodiments, the lithium salt comprises at least one of LiTFSI, LiFSI, LiI, $LiPF_6$, $LiAsF_6$, LiBOB and derivatives thereof.

In certain embodiments involving the electrochemical cells described above and herein, the polymer further comprises a spacer group positioned between the electron withdrawing group and electron donating group.

In certain embodiments involving the electrochemical cells described above and herein, the molar ratio of double bonds attached to an electron withdrawing group monomer to double bonds attached to an electron donating group is approximately one to one.

In certain embodiments involving the electrochemical cells described above and herein, at least one of the monomer and comonomer, or the olefinic monomer having at least two double bonds, comprises at least one functional group selected from the group consisting of poly(ethylene oxide), lithiated sulfonate groups, lithiated carboxylate groups, and lithiated trifluoromethanesulfonylimide groups. In some embodiments, at least one of the monomer and comonomer, or to the olefinic monomer having at least two double bonds, comprises poly(ethylene oxide).

In certain embodiments involving the electrochemical cells described above and herein, the electrochemical cell further comprises a cathode comprising sulfur as an active cathode species. In certain embodiments, the electrochemical cell is a lithium metal battery. In other embodiments, the electrochemical cell is a lithium ion battery.

In one set of embodiments, a series of methods for forming a component for use in an electrochemical cell is provided. In one embodiment, a method for forming a component for use in an electrochemical cell includes: providing an electroactive layer; depositing an olefinic monomer comprising at least one electron withdrawing group and an olefinic comonomer comprising at least one electron donating group on a surface; and polymerizing the monomer and comonomer using a free radical mechanism to form a polymer layer.

In another embodiment, a method for forming a component for use in an electrochemical cell includes: providing an electroactive layer; depositing a monomer comprising a maleimide and a comonomer comprising a vinyl ether on a surface; and polymerizing the monomer and comonomer using a free radical mechanism to form a polymer layer.

In another embodiment, a method for forming a component for use in an electrochemical cell comprises providing an electroactive layer, and depositing onto a surface: a) an olefinic monomer comprising at least one electron withdrawing group attached to a double bond and at least one olefinic comonomer comprising at least one electron donating group attached to a double bond, or b) an olefinic monomer having at least two double bonds, at least one electron withdrawing group attached to one of the double bonds, and at least one electron donating group attached to another of the double bonds. The method involves polymerizing the monomer(s) using a free radical mechanism to form a polymer layer.

In certain embodiments involving the method(s) described above and herein, the olefinic monomer comprising the at least one electron withdrawing group comprises a maleimide or maleic anhydride and the comonomer comprising the at least one electron donating group comprises a vinyl ether. In other embodiments, the olefinic monomer having at least two double bonds comprises at least one maleimide or maleic anhydride and at least one vinyl ether.

In certain embodiments involving the method(s) described above and herein, the electron withdrawing group is selected from the group consisting of a haloalkyl, —CN, —COOR$_1$, —C(=O)R$_1$—CON(R$_1$)$_2$, —CONR$_1$H, halogen, —NO$_2$, —NR$_1$OR$_1$, SO$_3$R$_1$, —SO(OR$_1$)$_2$, —SO(OR$_1$) H, —SOR$_1$, —SO$_2$R$_1$, —PO(OR$_1$)$_2$, —PO(OR$_1$)H, and protonated amine groups, wherein two electron withdrawing groups attached in the 1,2-position to the double bond may form together with the double bond of a 5- to 6-membered substituted or unsubstituted, unsaturated cycle or heterocycle. Each occurrence of R$_1$ is independently selected from the group consisting of hydrogen; halogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; substituted or unsubstituted heteroaryl, substituted or unsubstituted, branched or unbranched alkylene oxide or poly(alkylene oxide); a metal ion; an anionic group, and a lithium-containing group. R$_1$ may be linked to at least one further electron donating or electron withdrawing group attached to an olefinic double bond.

Additionally, in certain embodiments involving the method(s) described above and herein, the electron donating group comprises at least one group selected from the group consisting of an alkylamino, a heteroaryl, a cycloalkyl, a cycloalkenyl, a cycloalkynyl, —OCOR$_2$, —NR$_2$COR$_2$, —OR$_2$, —SR$_2$, —Si(OR$_2$)$_3$, —Si(OR$_2$)$_2$H, —Si(OR$_2$)H$_2$, —Si(R$_2$)$_3$, —Si(R$_2$)$_2$H, —Si(R$_2$)H$_2$,

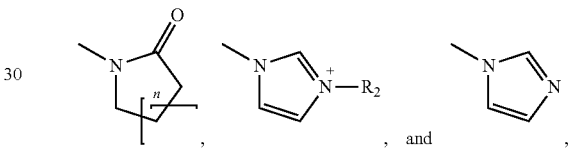

, , and , and wherein each occurrence of R$_2$ is independently selected from the group consisting of hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; substituted or unsubstituted heteroaryl; substituted or unsubstituted, branched or unbranched alkylene oxide or poly(alkylene oxide); a metal ion; an anionic group; and a lithium-containing group, wherein n is 1, 2 or 3. R$_2$ may optionally be linked to at least one further electron donating or electron withdrawing group attached to an olefinic double bond.

In certain embodiments involving the method(s) described above and herein, depositing the monomer comprises using at least one of doctor blading, spray coating, spin coating, solution casting, and vapor deposition. In other embodiments, flash evaporation is used.

In certain embodiments involving the method(s) described above and herein, polymerizing comprises applying at least one of UV light, an electron beam, or thermal energy to the monomer and comonomer, or to the olefinic monomer having at least two double bonds, to activate the free radical mechanism. In some cases, polymerizing comprises polymerizing the monomers within less than or equal to 5 seconds, less than or equal to 3 seconds, or less than or equal to 1 second.

In certain embodiments involving the method(s) described above and herein, the method involves forming an ion conductive layer on the electroactive layer. In some cases, the ion conductive layer is positioned between the electroactive layer and the layer comprising the polymer.

In certain embodiments, depositing the monomer and the comonomer on the surface further comprises depositing the monomer and the comonomer on a surface of the electroactive layer, or on a surface of the ion conductive layer.

In certain embodiments, depositing the olefinic monomer having at least two double bonds on the surface further comprises depositing the olefinic monomer on a surface of the electroactive layer, or on a surface of the ion conductive layer.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
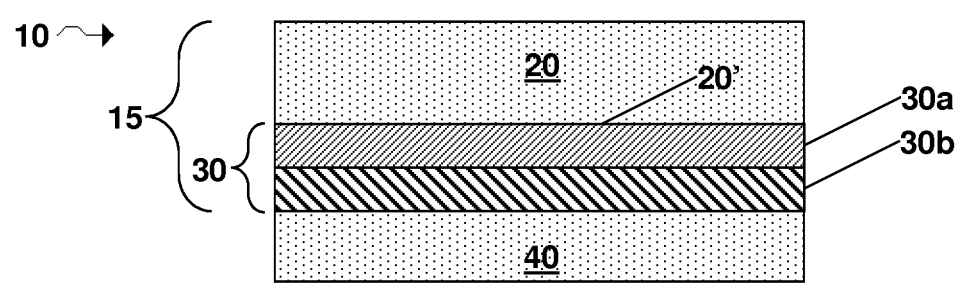
FIG. 1 shows an article for use in an electrochemical cell according to one set of embodiments.

Polymer compositions, and more specifically, polymer compositions for use in electrochemical cells, are provided. The disclosed polymer compositions may be formed from the copolymerization of at least one olefinic monomer comprising at least one electron withdrawing group attached to a double bond and at least one olefinic comonomer comprising at least one electron donating group attached to a double bond. In other embodiments, the disclosed polymer compositions may be formed from the polymerization of an olefinic monomer possessing at least two double bonds. In some cases, at least one electron withdrawing group is attached to one of the double bonds, and at least one electron donating group attached to another of the double bonds. In certain instances, each double bond of an olefinic monomer has attached thereto one or more electron donating groups or one or more electron withdrawing groups. The resulting polymer may include structural units comprising the at least one electron withdrawing group that alternate with structural units comprising the at least one electron donating group.

Depending upon the particular embodiment, the monomer and/or comonomer may include, in some cases, a maleimide. The monomers may be polymerized via a free radical shift mechanism. The polymerization reaction may be initiated by, for example, UV light, an electron beam, or thermal energy dependent upon the particular free radical mechanism.

The disclosed polymer compositions may be incorporated into electrode structures described herein. For example, the electrode structures may include one or more polymer layers, e.g., in a multi-layered structure. The multi-layered structure may include one or more ion conductive layers and one or more polymer layers comprising the polymers disclosed herein disposed adjacent to the one or more ion conductive layers. The resulting structures may be highly conductive to electroactive material ions and may protect the underlying electroactive material surface from reaction with components in the electrolyte. In another set of embodiments, an electrochemical cell may include a gel polymer electrolyte layer comprising the disclosed polymer compositions. In some cases, such protective layers and/or gel polymer layers may be suitable for use in an electrochemical cell including an electroactive material comprising lithium (e.g., metallic lithium).

As described herein, in some embodiments, a disclosed polymer composition may be formed from the copolymerization of a monomer having an electron withdrawing group and a comonomer having an electron donating group. For instance, copolymerization may involve at least one olefinic monomer comprising at least one electron withdrawing group attached to a double bond and at least one olefinic comonomer comprising at least one electron donating group attached to a double bond. The inventors have recognized the benefits associated with using a polymer based on such copolymerization. For example, an olefinic monomer having at least one electron withdrawing group and an olefinic comonomer having at least one electron donating group may enable the production of fast, radically-curable polymer films for use in an electrochemical cell. Furthermore, the resulting polymers may have good mechanical and chemical stability in the associated electrochemical cells, and especially for lithium-sulfur based systems. In certain embodiments, the disclosed polymer may be incorporated into the electrochemical cell as a protective layer on various components, a polymer gel electrolyte, a separator, and/or any other appropriate application with an electrochemical cell. Therefore, the current disclosure should be viewed generally as disclosing the use of the currently described polymers with an electrochemical cell, and should not be limited to only the specific constructions disclosed herein.

With regards to the polymerization of the currently described polymers, the polymerization reaction between the monomer and comonomer, or the polymerization reaction between the olefinic monomers having two double bonds, may advantageously be initiated by a free radical mechanism. Thus, the polymerization reaction may be initiated by, for example, UV light, an electron beam, thermal energy, or any other appropriate energy source. This may be particularly advantageous in the context of use in an electrochemical cell since the polymerization reaction may be conducted at a temperature below a degradation temperature and/or melting temperature of the associated electroactive layers and/or complements within the electrochemical cell. Furthermore, by selecting specific functional groups the reaction kinetics may be tailored to provide a relatively fast curing time, e.g., on the order of several seconds. For example, the polymerization reaction may occur within less than or equal to 5 seconds, less than or equal to 3 seconds, or less than or equal to 1 second.

Furthermore, in some embodiments, the methods described herein may enable the inclusion of ionic compounds (i.e., salts) in the disclosed compositions. For example, in some embodiments, lithium salts may be advantageously included in a polymer layer in relatively high amounts. Inclusion of the lithium and/or other salts may increase the ion conductivity of the material. Increases in the ion conductivity of the material may enable enhanced ion diffusion between associated anodes and cathodes within an electrochemical cell. Therefore, inclusion of the salts may enable increases in specific power available from an electrochemical cell and/or extend the useful life of an electrochemical cell due to the increased diffusion rate of the ion species therethrough.

Moreover, in certain embodiments, the compositions described herein can be formed using flash evaporation methods, which may enable the incorporation of salts in the composition. The monomer (and optional comonomer(s)) described herein may also be chosen to be compatible with flash evaporation methods. For example, in some embodiments, in addition to possessing mechanical stability and chemical stability within the components in the final electrochemical cell, to be suitable for flash evaporation methods, the monomer (and optional comonomer) may need to be able to evaporate and condense while in high vacuum. Therefore, monomers (and optional comonomers) with vapor pressures suitable for use with flash evaporation methods may be specifically used to enable this manufacturing method. In addition to the above, it may also be desirable that the monomer and optional comonomer undergo copolymerization via a radical copolymerization process (e.g., on the order of seconds) combined with a flash evaporation method.

Depending upon the intended use, in some embodiments, the monomer and comonomer may both exhibit intrinsic ionic conductivity, only one may exhibit intrinsic ionic conductivity, or neither may exhibit intrinsic ionic conductivity. For example, without wishing to be bound by theory, when used in the dry state, at least one of the monomers may exhibit intrinsic ionic conductivity to provide ion transport. For instance, at least one of the monomers, and therefore the resulting polymer, may include one or more lithium-containing groups (e.g., lithium salts). Optionally, one or more lithium-containing groups may be added to further enhance ion conductivity of the polymer. In other embodiments, the resulting polymer is intrinsically non-ionically conductive, and one or more lithium-containing groups are added to the resulting polymer to enhance the polymer's lithium ion conductivity in the dry state. In some embodiments, the one or more lithium-containing groups (e.g., lithium salts) added to the polymer is/are the same lithium-containing groups (e.g., lithium salts) present in the solvent/electrolyte to be used with the electrochemical cell. However, in other embodiments, different lithium-containing groups may be used in the polymer and the solvent/electrolyte.

Alternatively, when used in the swollen state, both the monomer and comonomer may be non-ionically conductive since ion transport can be provided by the solvent/electrolyte (which may contain lithium-containing groups in the form of dissolved salts). Embodiments in which only one of the monomer and comonomer, or both the monomer and comonomer, are intrinsically ionically conductive are also possible. In certain embodiments, at least one of the monomers (and therefore the resulting polymer) includes one or more lithium-containing groups and one or more lithium-containing groups are added to the polymer in the swollen state (e.g., via the solvent/electrolyte) to enhance the polymer's lithium-ion conductivity.

Such combinations of intrinsic ionic conductivity (or non-ionic conductivity) of the monomer(s) (and resulting polymer) and the presence (or absence) of lithium-containing groups are also possible for embodiments in which a monomer having both electron withdrawing groups and electron donating groups, as well as at least two double bonds, is used to form the polymer.

In yet another embodiment, the polymerization of the monomers described herein may result in a polymer that is more stable to hydrolysis and other reactions with polysulfides in lithium-sulfur batteries compared to certain existing polymers (e.g., polyacrylates).

As noted above, the currently described polymers may be formed from the copolymerization of two different monomers separately functionalized with an electron withdrawing group and an electron donating group. In embodiments where separate monomers are used to provide the electron withdrawing group and electron donating group, a first structural unit (e.g., repeat unit) may correspond to the monomer incorporating the electron withdrawing group. Similarly, a second structural unit (e.g., repeat unit) may correspond to the monomer incorporating the electron donating group. On subsequent polymerization, a resulting polymer chain may have the formula -[Structural Unit 1]$_n$-[Structural Unit 2]$_m$-, where n and m are integers greater than 2. Depending upon the specific monomers selected, the structural units (e.g., repeat units) may be arranged in a pattern corresponding to a block copolymer, a random copolymer, and/or an alternating copolymer having varying lengths and molecular weights. As described herein, in some cases at least one olefinic monomer comprises at least one electron withdrawing group attached to a double bond, and at least one olefinic comonomer comprises at least one electron donating group attached to a double bond. In some embodiments, the resulting polymer includes structural units comprising the at least one electron withdrawing group that alternate with structural units comprising the at least one electron donating group. The resulting polymer may be branched, or unbranched. In some embodiments, the resulting polymer is crosslinked.

It should be appreciated that while each of the monomer or comonomer may include an electron withdrawing group and/or an electron donating group in some embodiments, in other embodiments the corresponding structural unit (e.g., repeat unit) in the resulting polymer may not include such an electron withdrawing group or an electron donating group, since the electron withdrawing group or an electron donating group of the monomer may undergo a reaction upon polymerization.

While separate monomers including the electron withdrawing groups and electron donating groups have been disclosed, the current disclosure is not limited in this fashion. For example, in certain embodiments, the polymer may be formed from a hybrid monomer functionalized with both an electron withdrawing group and an electron donating group as described in more detail below. In such an embodiment, the polymer may be formed from a single structural unit (e.g., repeat unit) derived from the hybrid monomer. In another example, additional structural units may be present in a composition, such as -[Structural Unit 1]$_n$-[Structural Unit 2]$_m$-[Structural Unit 3]$_p$-, where the third structural unit may include an electron withdrawing group, an electron donating group, or a compound absent an electron withdrawing group or an electron donating group. A structural unit having neither an electron withdrawing group nor an electron donating group may, for example, improve a desired property of the resulting polymer or the processability of the resulting polymer. Other configurations of structural units are also possible.

In some embodiments, each of n and m may be, independently, greater than or equal to approximately 1, 2, 3, 4, 5, 6, 7, 8, 9, 10, 20, 30, 40, 50, 60, 70, or any other suitable value. Further, each of n and m may be, independently, less than or equal to approximately 100, 90, 80, 70, 60, 50, 40, 30, 20, 10, 9, 8, 7, 6, 5, or any other suitable value. For example, each of n and m may be, independently, between approximately 1 and 100 in some embodiments, or between approximately 1 and 10 in other embodiments. Other combinations of the above-referenced ranges are also possible. In some embodiments, n and m are approximately equal, though other embodiments in which they are unequal are also possible. In certain embodiments, p is less each of n and m. In some cases, p is a fraction of n+m. For example, p may be less than or equal to approximately 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, or any other suitable fraction of, n+m. For example, in one embodiment, p is between approximately 0.1% to approximately 10% of n+m.

In some embodiments, the average molecular weight (MO of the monomer/comonomer may be greater than or equal to approximately 100 g/mol, 150 g/mol, 200 g/mol, 250 g/mol, 300 g/mol, 400 g/mol, 500 g/mol, 600 g/mol, 700 g/mol, 800 g/mol, 900 g/mol, 1000 g/mol, 1100 g/mol, 1200 g/mol, 1300 g/mol, 1400 g/mol, 1500 g/mol, 1800 g/mol, or any other suitable molecular weight. Further, the molecular weight of the monomer may be less than approximately 2000 g/mol, 1900 g/mol, 1800 g/mol, 1700 g/mol, 1600 g/mol, 1500 g/mol, 1400 g/mol, 1300 g/mol, 1200 g/mol, 1100 g/mol, 1000 g/mol, 900 g/mol, 800 g/mol, 700 g/mol, 600 g/mol, 500 g/mol, or any other appropriate molecular weight. Combinations of the above are possible (e.g., a molecular weight of approximately 100 g/mol to approximately 2000 g/mol, approximately 100 g/mol to approximately 1000 g/mol, or approximately 150 g/mol to approximately 500 g/mol). Other combinations are also possible.

In some embodiments, the average molecular weight (e.g., number average molecular weight, $M_n$) of the resulting polymer may be greater than or equal to approximately 1000 g/mol, 5000 g/mol, 10,000 g/mol, 15,000 g/mol, 20,000 g/mol, 50,000 g/mol, 100,000 g/mol, 200,000 g/mol, 300,000 g/mol, 400,000 g/mol, 500,000 g/mol, 1,000,000 g/mol, 2,000,000 g/mol, 3,000,000 g/mol, 4,000,000 g/mol, or any other appropriate molecular weight. Further, the molecular weight of the resulting polymer may be less than approximately 5,000,000 g/mol, 4,000,000 g/mol, 3,000,000 g/mol, 2,000,000 g/mol, 1,000,000 g/mol, 500,000 g/mol, 400,000 g/mol, 300,000 g/mol, 200,000 g/mol, 100,000 g/mol, 50,000 g/mol, 20,000 g/mol, 15,000 g/mol, 10,000 g/mol, 5000 g/mol, or any other appropriate molecular weight. Combinations of the above are possible (e.g. a molecular weight of approximately 1000 g/mol to approximately 5,000,000 g/mol or approximately 5000 g/mol to approximately 20,000 g/mol). Other combinations are also possible. The molecular weight can be determined by known methods, in particular by gel permeation chromatography (GPC).

Without wishing to be bound by theory, the molecular weight of the monomer/comonomer may affect the material's vapor pressure and evaporation characteristics. For example, a monomer with a relatively low molecular weight may exhibit too high a vapor pressure. Correspondingly, a monomer with a relatively high molecular weight might be unable to be evaporated. However, it should be appreciated that varying molecular weights may be suitable depending on the particular process used to form the polymer, the desired material properties of the resulting layer, and/or other factors.

Having generally described the types of polymers in the compositions described herein, the incorporation of the polymers into an electrochemical cell will now be described. While many embodiments described herein describe lithium rechargeable electrochemical cells, any appropriate electrochemical cell chemistry could be used. For example, the description provided herein may refer to lithium/sulfur batteries, other lithium metal batteries, or lithium ion batteries. Moreover, wherever lithium electrochemical cells are described herein, it is to be understood that any analogous alkali metal electrochemical cells (including alkali metal anodes) can be used. Additionally, although rechargeable electrochemical cells are primarily disclosed herein, non-rechargeable (primary) electrochemical cells are intended to benefit from the polymer embodiments described herein as well.

As described herein, in some embodiments an article such as an electrode or electrochemical cell includes a protective structure that incorporates one or more of the herein disclosed polymers to separate an electroactive material from an electrolyte to be used with the electrode or electrochemical cell. The separation of an electroactive layer from the electrolyte of an electrochemical cell can be desirable for a variety of reasons, including (e.g., for lithium batteries) the prevention of dendrite formation during recharging, preventing reaction of lithium with the electrolyte or components in the electrolyte (e.g., solvents, salts and cathode discharge products), increasing cycle life, and improving safety (e.g., preventing thermal runaway). Reaction of an electroactive lithium layer with the electrolyte may result in the formation of resistive film barriers on the anode, which can increase the internal resistance of the battery and lower the amount of current capable of being supplied by the battery at the rated voltage.

While a variety of techniques and components for protection of lithium and other alkali metal anodes are known, these protective coatings present particular challenges, especially in rechargeable batteries. Since lithium batteries function by removal and re-plating of lithium from a lithium anode in each charge/discharge cycle, lithium ions must be able to pass through any protective coating. The coating must also be able to withstand morphological changes as material is removed and re-plated at the anode. The effectiveness of the protective structure in protecting an electroactive layer may also depend, at least in part, on how well the protective structure is integrated with the electroactive layer, the presence of any defects in the structure, and/or the smoothness of the layer(s) of the protective structure. Many single thin film materials, when deposited on the surface of an electroactive lithium layer, do not have all of the necessary properties of passing Li ions, forcing a substantial amount of the Li surface to participate in current conduction, protecting the metallic Li anode against certain species (e.g., liquid electrolyte and/or polysulfides generated from a sulfur-based cathode) migrating from the cathode, and impeding high current density-induced surface damage.

The inventors of the present application have developed solutions to address the problems described herein through several embodiments of the invention, including, in one set of embodiments, the combination of an electroactive layer and a protective structure including a layer formed at least in part of a polymer described herein. In another set of embodiments, an electroactive layer may include a protective structure in combination with a polymer gel layer formed from one or more the polymers disclosed herein positioned adjacent the protective structure.

In another set of embodiments, solutions to the problems described herein involve the use of an article including an anode comprising lithium, or any other appropriate electroactive material, and a multi-layered structure positioned between the anode and an electrolyte of the cell. The multi-layered structure may serve as a protective layer or structure as described herein. In some embodiments, the multi-layered structure may include at least a first ion conductive material layer and at least a first polymeric layer formed from one or more of the polymers disclosed herein and positioned adjacent the ion conductive material. In this embodiment, the multi-layered structure can optionally include several sets of alternating ion conductive material layers and polymeric layers. The multi-layered structures can allow passage of lithium ions, while limiting passage of certain chemical species that may adversely affect the anode (e.g., species in the electrolyte). This arrangement can provide significant advantage, as polymers can be selected that impart flexibility to the system where it can be needed most, namely, at the surface of the electrode where morphological changes occur upon charge and discharge.

In another embodiment, one or more of the polymers described herein may be deposited between the active surface of an electroactive material and an electrolyte to be used in the electrochemical cell. Other configurations of polymers and polymer layers are also provided herein.

Turning now to the figures, FIG. 1 shows a specific example of an article that can be used in an electrochemical cell according to one set of embodiments. As shown in this exemplary embodiment, article 10 includes an anode 15 comprising an electroactive layer 20. The electroactive layer comprises an electroactive material (e.g., lithium metal). In certain embodiments, the electroactive layer may covered by a protective structure 30, which can include, for example, an ion conductive layer 30a disposed on an active surface 20' of the electroactive layer 20 and a layer 30b formed from one or more polymers disclosed herein and disposed on the ion conductive layer 30a. The protective structure may, in some embodiments, act as an effective barrier to protect the electroactive material from reaction with certain species in the electrolyte. In some embodiments, article 10 includes an electrolyte 40, which may be positioned adjacent the protective structure, e.g., on a side opposite the electroactive layer. The electrolyte can function as a medium for the storage and transport of ions. In some instances, electrolyte 40 may comprise a gel polymer electrolyte formed from the compositions disclosed herein.

A layer referred to as being "covered by", "on", or "adjacent" another layer means that it can be directly covered by, on, or adjacent the layer, or an intervening layer may also be present. A layer that is "directly adjacent", "directly on", or "in contact with", another layer means that no intervening layer is present. It should also be understood that when a layer is referred to as being "covered by", "on", or "adjacent" another layer, it may be covered by, on or adjacent the entire layer or a part of the layer.

It should be appreciated that FIG. 1 is an exemplary illustration and that in some embodiments, not all components shown in the figure need be present. In yet other embodiments, additional components not shown in the figure may be present in the articles described herein. For example, in some cases, protective structure 30 may be a multilayer structure including 3, 4, 5, or more layers, as described in more detail below. In another example, although FIG. 1 shows an ion conductive layer 30a disposed on the surface of the electroactive layer, in other embodiments, layer 30b may be disposed on the surface of the electroactive layer. Other configurations are also possible.

As noted above, in some embodiments, layer 30b may formed from one or more monomers having one or more electron withdrawing groups and/or electron donating groups. In some embodiments, the monomer may be an olefinic monomer, acrylic monomer, styrenic monomer, vinylic monomer, or any other appropriate monomer. An olefinic monomer may comprise, in some instances, at least one electron withdrawing group attached to a double bond or at least one electron donating group attached to a double bond. In some embodiments, at least one of the olefinic monomers comprises at least two double bonds, wherein each double bond has attached thereto one or more electron donating groups or one or more electron withdrawing groups. The monomer may be able to participate in a free radical mechanism to form a polymer. In certain embodiments, the monomer includes an olefin positioned at one or more terminal ends of the monomer. In other embodiments, a monomer may include other reactive groups suitable for polymerization including, but not limited to, alkynl groups, dienes, thiols, epoxies, and other heroalkyl groups.

In some instances, the monomer is bifunctional, trifunctional, or multifunctional. Without wishing to be bound by theory, branched and "multi-arm" structures may be considered to be multifunctional. For example, ethanol is monofunctional, glycol is bifunctional, glycerol is trifunctional, and pentaerythrol is tetrafunctional. Other non-limiting examples of bifunctional monomers include, but are not limited to, triethyleneglcyol divinyl ether, 1,4-cyclohexanedimethanoldivinylether, 1,4-Butanediol divinyl ether, 1,1'-(Methylenedi-4,1-phenylene)bismaleimide, and N,N'-(1,4-Phenylene)dimaleimide.

As described herein, in some embodiments, a monomer or resulting polymer (e.g., a structural unit of a polymer) includes at least one electron withdrawing group. An electron withdrawing group, in the context of monomers as described herein, generally refers to a group that draws electrons away from the reaction center of the monomer, or away from the backbone of the polymer. For example, the fluorine atom in the monomer HC=CHF is an electron withdrawing group with respect to the reactive olefin group. When such a monomer is used to form into a polymer, the fluorine group is electron withdrawing with respect to the backbone of the polymer. The electron withdrawing groups described herein may have different polarizations and reactivities, as described in more detail below. An electron withdrawing group may be charged or uncharged.

With regards to the polymer compositions, in one embodiment, the at least one electron withdrawing group included in a monomer or resulting polymer may be selected from a number of different compounds. For example, the monomer comprising at least one electron withdrawing group may be a functionalized olefin, a maleimide having the general structure

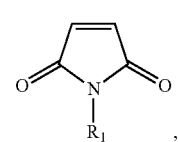

a (bis)maleimide having the general structure

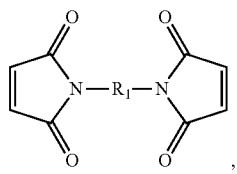

or a maleic anhydride having the general structure

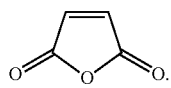

In other embodiments, an electron withdrawing group incorporated into the monomer or resulting polymer (e.g., a repeat or structural unit of a polymer) may include, but is not limited to, a haloalkyl, —CN, —COOR$_1$, —C(=O)R$_1$, —CON(R$_1$)$_2$, —CONR$_1$H, halogen, —NO$_2$, —SO$_3$R$_1$, —SO(OR$_1$)$_2$, —SO(OR$_1$)H, —SOR$_1$, —SO$_2$R$_1$, —PO(OR$_1$)$_2$, —PO(OR1)H, and protonated amine groups such as —NR3$^+$ and —NH$_3^+$, and —CF$_3$. In some embodiments involving an olefinic monomer comprising at least one electron withdrawing group attached to a double bond, two electron withdrawing groups attached in the 1,2-position to the double bond may form together with the double bond of a 5- to 6-membered substituted or unsubstituted, unsaturated cycle or heterocycle. In other embodiments, a maleimide structure is used in which the phenyl/aryl is not the withdrawing group but both the carbonyl groups attached to the olefinic group are electron withdrawing. In such an embodiment, the withdrawing effect may be enhanced by using specific moieties such as perfluorinated aryl, sulfonated aryl, or other appropriate moieties.

Without wishing to be bound by theory, each of the above groups (e.g., including a functionalized olefin, a maleimide, a (bis)maleimide, a maleic anhydride, and/or other electron withdrawing groups described herein) may exhibit electron withdrawing properties regardless of the specific functionality of R$_1$. Further, R$_1$ may exhibit electron withdrawing or donating properties, or in some instances it may be neither electron withdrawing or donating. In some embodiments, R$_1$ may exhibit functionalities that provide conductivity to the resulting polymer. In the above compounds, each occurrence of R$_1$ may be independently selected from hydrogen; halogen; substituted or unsubstituted, branched or unbranched aliphatic (e.g., an alkyl, alkenyl, alkynyl); substituted or unsubstituted cyclic (e.g., cycloalkyl, cycloalkenyl, or cycloalkynyl); substituted or unsubstituted, branched or unbranched acyclic; substituted or unsubstituted, branched or unbranched heteroaliphatic; substituted or unsubstituted, branched or unbranched acyl; substituted or unsubstituted aryl; substituted or unsubstituted heteroaryl; substituted or unsubstituted, branched or unbranched alkyelene oxide or poly(alkylene oxide) such as substituted or unsubstituted, branched or unbranched ethylene oxide and substituted or unsubstituted, branched or unbranched propylene oxide; a metal ion; an anionic group; a lithium-containing group or a conducting salt such as a lithium-containing conducting salt (e.g., —SO$_2$NLiSO$_2$CF$_3$, aryl-SO$_3$Li (e.g., -PhSO$_3$Li) or alkyl-SO$_3$Li); and/or appropriate mixtures of the above. In certain embodiments, —CH$_2$CH$_2$O— may be included to provide conductivity to the resulting polymer. In some embodiments, R$_1$ may be linked to at least one further electron donating or electron withdrawing group attached to an olefinic double bond.

In embodiments in which the electron withdrawing group comprises a heteroaryl group, the heteroaryl group may be, for example, a 3-, 4-, 5-, or 6-membered ring. In some embodiments, the heteroaryl group comprises one or more (e.g., 2, 3) heteroatoms in the ring of the heteroaryl structure. The one or more heteroatoms may each be, for example, nitrogen, oxygen, sulfur, or phosphorus.

Several non-limiting examples of olefinic monomers incorporating electron withdrawing groups are depicted below.

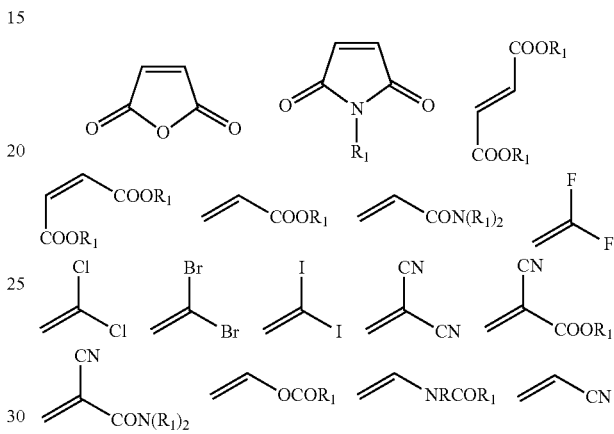

Specific non-limiting examples of the functionalized maleimides are depicted below. In addition to the use of maleimides, the monomer may include (bis)maleimides. In the depicted embodiments, X may be substituted or unsubstituted, branched or unbranched aliphatic (e.g., an alkyl, alkenyl, alkynyl, cycloalkyl, cycloalkenyl, or cycloalkynyl); substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; or substituted or unsubstituted heteroaryl, oxygen, or sulfur. In some cases, X is a substituted or unsubstituted, branched or unbranched alkyelene oxide or poly(alkylene oxide) such as substituted or unsubstituted, branched or unbranched ethylene oxide and substituted or unsubstituted, branched or unbranched propylene oxide; a metal ion; an anionic group; a lithium-containing group or a conducting salt such as a lithium-containing conducting salt (e.g., —SO$_2$NLiSO$_2$CF$_3$, aryl-SO$_3$Li (e.g., -PhSO$_3$Li) or alkyl-SO$_3$Li); and/or appropriate mixtures of the above.

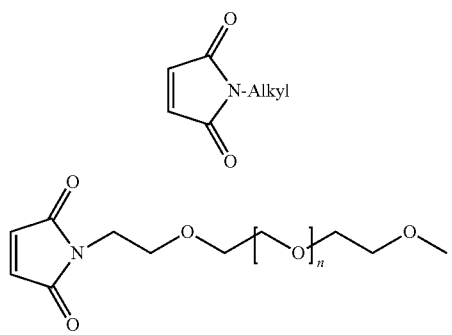

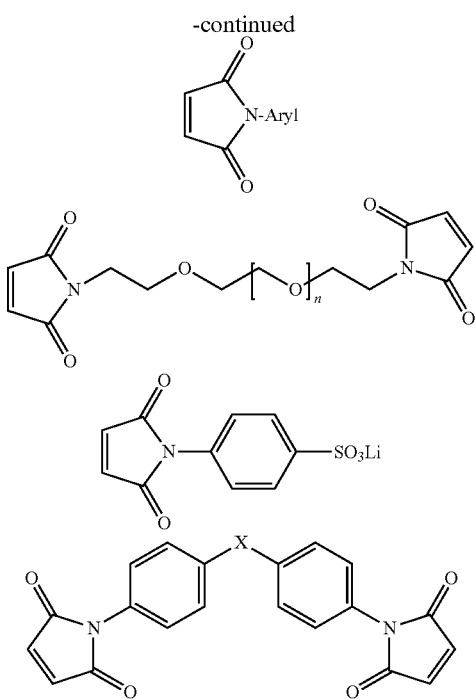

As described herein, in some embodiments, a monomer or resulting polymer (e.g., a structural unit of a polymer) includes at least one electron donating group. An electron donating group, in the context of monomers and polymers as described herein, generally refers to a group that donates electrons towards the reaction center of the monomer, or towards the backbone of the polymer. For example, the —$OCH_3$ group in the monomer HC=$CHOCH_3$ is an electron donating group with respect to the reactive olefin group. When such a monomer is used to form a polymer, the —$OCH_3$ group is electron donating with respect to the backbone of the polymer. The electron donating groups described herein may have different polarizations and reactivities, as described in more detail below. An electron donating group may be charged or uncharged.

In some embodiments, the electron donating group included in a monomer (e.g., a comonomer) may be a functionalized olefin. In certain embodiments, an electron donating group incorporated into the monomer or resulting polymer (e.g., a structural unit of a polymer) may include, for example, at least one of an alkylamino, a heteroaryl, a cycloalkyl, a cycloalkenyl, a cycloalkynyl, —$OCOR_2$, —$NR_2COR_2$, —$OR_2$, —$SR_2$, —$Si(OR_2)_3$, —$Si(OR_2)_2H$, —$Si(OR_2)H_2$, —$Si(R_2)_3$, —$Si(R_2)_2H$, —$Si(R_2)H_2$,

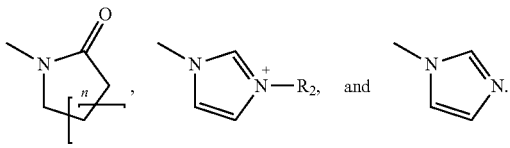

In the above compounds each occurrence of $R_2$ may be selected from hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; substituted or unsubstituted heteroaryl; substituted or unsubstituted, branched or unbranched alkyelene oxide or poly(alkylene oxide) such as substituted or unsubstituted, branched or unbranched ethylene oxide, substituted or unsubstituted, branched or unbranched propylene oxide, polyethylene glycol, polypropylene glycol, and ethylene oxide/propylene oxide mixtures; a metal ion; an anionic group; a lithium-containing group or a conducting salt such as a lithium-containing conducting salt (e.g., Aryl-$SO_3Li$ (e.g., -$PhSO_3Li$), Alkyl-$SO_3Li$, and —$SO_2NLiSO_2CF_3$); and/or appropriate mixtures of the above. In some of the above compounds, n is 1, 2 or 3. In certain embodiments, —$CH_2CH_2O$— may be included to provide conductivity to the resulting polymer. In some embodiments, $R_2$ may be optionally linked to at least one further electron donating or electron withdrawing group attached to an olefinic double bond.

In embodiments in which the electron donating group comprises a heteroaryl group, the heteroaryl group may be, for example, a 3-, 4-, 5-, or 6-membered ring. In some embodiments, the heteroaryl group comprises one or more (e.g., 2, 3) heteroatoms in the ring of the heteroaryl structure. The one or more heteroatoms may each be, for example, nitrogen, oxygen, sulfur, or phosphorus.

In certain embodiments, the monomer including an electron donating group may comprise an ether group. In some embodiments, the ether group may be a polyether group (e.g., a polyalkylenoxide such as polyethylene glycol). For example, the polyethylene glycol unit may be defined by the formula —$(C_2H_4O)_n$—, where n is an integer greater than 1. In some embodiments, n may be greater than or equal to 2, greater than or equal to 3, greater than or equal to 4, greater than or equal to 6, greater than or equal to 8, greater than or equal to 10, greater than or equal to 20, greater than or equal to 30, greater than or equal to 40, or any other suitable value. In certain embodiments, n may be less than or equal to 50, less than or equal to 40, less than or equal to 30, less than or equal to 20, less than or equal to 10, less than or equal to 8, less than or equal to 6, less than or equal to 4, or less than or equal to 2, or any other suitable value. Combinations of the above-noted ranges are also possible (e.g., n may be greater than or equal to 1 and less than or equal to 50). Other ranges of n are also possible.

In addition to the above, in one set of embodiments, at least one of the monomer and comonomer includes at least one functional group selected from the group consisting of poly(ethylene oxide), poly(propylene oxide), ethylene oxide/propylene oxide mixtures, lithiated sulfonate groups, lithiated carboxylate groups, and lithiated trifluoromethanesulfonylimide groups. In one particular embodiment, at least one of the monomer and comonomer comprise poly(ethylene oxide).

In some cases, the monomer may be a vinyl ether. Non-limiting examples of vinyl ethers include polyethylene glycol vinyl ethers, polyethylene glycol divinyl ethers, triethylenglycol divinyl ether, tetraethyleneglycol divinyl ether, butandiol divinyl ether, dodecyl vinyl ether, and cyclohexyl vinyl ether.

Several non-limiting examples of monomers (e.g., comonomers) incorporating electron donating groups are depicted below.

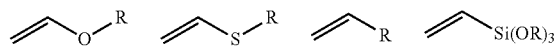

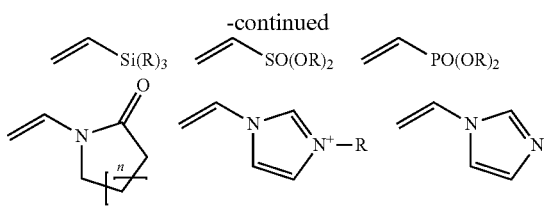

While some of the above embodiments described herein involve the copolymerization of a monomer incorporating an electron withdrawing group and a comonomer incorporating an electron donating group, in other embodiments, the functionality of both the monomer and comonomer may be combined in a single hybrid monomer. In certain embodiments, the resulting polymer formed from the hybrid monomer also includes an electron withdrawing group and an electron donating group. For example, a hybrid monomer composed of an olefin or other reactive group suitable for polymerization may be functionalized with both a functional group that acts as an electron withdrawing group and a functional group that acts as an electron donating group. In some embodiments, the monomer is an olefinic monomer having at least two double bonds, at least one electron withdrawing group attached to one of the double bonds, and at least one electron donating group attached to another of the double bonds. In one particular embodiment, the olefinic monomer having at least two double bonds comprises at least one maleimide or maleic anhydride and at least one vinyl ether.

Consequently, in one embodiment, a layer is formed by depositing onto a surface (and then subsequently polymerizing) an olefinic monomer having at least one electron withdrawing group and at least one electron donating group. In addition, the hybrid monomer may include one or more of each type of functional group. The specific functional groups included in a hybrid monomer may be selected from the above disclosed functional groups for the separate monomer including an electron withdrawing group and comonomer including the electron donating group. One non-limiting example of a hybrid monomer is depicted below wherein the carboxyl groups of the maleimide acts as electron withdrawing groups and the polyethylene glycol group acts as an electron donating group:

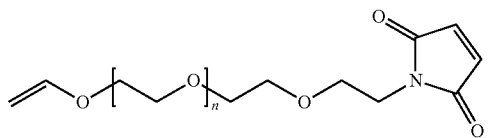

In some embodiments involving the above-noted compound, n is an integer greater than 1. For example, n may be greater than or equal to 2, greater than or equal to 3, greater than or equal to 4, greater than or equal to 6, greater than or equal to 8, greater than or equal to 10, greater than or equal to 20, greater than or equal to 30, greater than or equal to 40, or any other suitable value. In certain embodiments, n may be less than or equal to 50, less than or equal to 40, less than or equal to 30, less than or equal to 20, less than or equal to 10, less than or equal to 8, less than or equal to 6, less than or equal to 4, or less than or equal to 2, or any other suitable value. Combinations of the above-noted ranges are also possible (e.g., n may be greater than or equal to 1 and less than or equal to 50). Other ranges of n are also possible.

As described herein, in one set of embodiments, the monomer including an electron withdrawing group and the comonomer including an electron donating group may be a maleimide (or maleic anhydride) and a vinyl ether, respectively. Specifically, the monomer including an electron withdrawing group may be a monomer described herein, such as N-phenyl maleimide, a bismaleimide, a polyethylene oxide maleimide, or other appropriate functionalized maleimide (or maleic anhydride). The comonomer including an electron donating group may be, for example, a triethylenglycol divinyl ether, butandiol divinyl ether, dodecyl vinyl ether, cyclohexyl vinyl ether, or other appropriate functionalized vinyl ether.

In certain embodiments in which the functionality of both the monomer and comonomer is combined in a single hybrid monomer, the resulting polymer may be formed by polymerization of an olefinic monomer including at least one maleimide or maleic anhydride and at least one vinyl ether.

In some embodiments, a polymer comprises a substituted or unsubstituted, branched or unbranched alkylene oxide or poly(alkylene oxide) (e.g., ethylene oxide, poly(ethylene oxide), propylene oxide, or poly(propylene oxide)), a metal ion; an anionic group; a lithium-containing group such as a conducting salt (e.g., a lithium-containing conducting salt such as $-SO_2NLiSO_2CF_3$, aryl-$SO_3Li$ (e.g., -$PhSO_3Li$) or alkyl-$SO_3Li$), and/or appropriate mixtures of the above.

As described herein, in certain embodiments, a monomer and/or polymer described herein includes one or more lithium-containing groups, such as a lithium ion, e.g., in the form of a lithium salt. For example, $R_1$ and/or $R_2$ may comprise a lithium ion (e.g., a lithium salt) and/or may be conductive to lithium ions, in some embodiments. Such a monomer and/or polymer may be intrinsically conductive to lithium ions even without the addition of dissolved lithium salts in a liquid electrolyte. In certain embodiments, such a monomer and/or polymer may be combined with one or more dissolved lithium salts in a liquid electrolyte to increase ion conductivity. For example, such a monomer and/or polymer may be intrinsically ionically conductive by including one or more lithium salts (e.g., lithium-containing groups), and may be combined with one or more of the same lithium salts contained in the electrolyte to be used with the electrochemical cell.

In one embodiment, at least one of the monomers is bifunctional or multifunctional (i.e., crosslinking). For example, vinyl ether which might be monofunctional (e.g., triethyleneglycol monomethyl vinyl ether) could be used with a bismaleimide. In another embodiment, both monomers are multifunctional. In yet another embodiment, both monomers are monofunctional.

In some of the above referenced embodiments, the monomer and comonomer are polymerized in a one to one molar ratio. If desired, polymerization in a ratio other than one to one may be possible. For example, the ratio of monomer including an electron withdrawing group to comonomer having an electron donating group (e.g., in a reaction mixture and/or in the resulting polymer) may be, for example, greater than or equal to 0.1:1, greater than or equal to 0.2:1, greater than or equal to 0.5:1, greater than or equal to 0.7:1, greater than or equal to 1:1, greater than or equal to 1.5:1, greater than or equal to 2:1, greater than or equal to 3:1, greater than or equal to 5:1, greater than or equal to 10:1. In some cases, the ratio of monomer including an electron withdrawing group to comonomer having an electron donating group (e.g., in a reaction mixture and/or in the resulting polymer) may be, for example, less than or equal to 10:1, less than or equal to 5:1, less than or equal to 3:1, less than or equal to 2:1, less than or equal to 1.5:1, less than or equal to 1:1, less than or equal to 0.7:1, less than or equal to 0.5:1, less than or equal to 0.2:1, less than or equal to 0.1:1. Combinations of the above-noted ranges are also possible (e.g., a ratio of greater than or equal to 0.1:1 and less than or equal to 1:1). Other ranges are also possible. As an example, in some embodiments, excess vinyl ether (an electron donating group) may be supplied to act as a plasticizer for the final co-polymerized material. Consequently, the structural and ion conductive properties of the resulting copolymer may be tailored by selecting the ratio of supplied monomer and comonomer.

In some of the above referenced embodiments, the molar ratio of double bonds attached to an electron withdrawing group to double bonds attached to an electron donating group is approximately one to one. If desired, a molar ratio other than one to one may be possible. For example, the molar ratio of double bonds attached to an electron withdrawing group to double bonds attached to an electron donating group (e.g., in a reaction mixture) may be, for example, greater than or equal to 0.1:1, greater than or equal to 0.2:1, greater than or equal to 0.5:1, greater than or equal to 0.7:1, greater than or equal to 1:1, greater than or equal to 1.5:1, greater than or equal to 2:1, greater than or equal to 3:1, greater than or equal to 5:1, greater than or equal to 10:1. In some cases, the molar ratio of double bonds attached to an electron withdrawing group to double bonds attached to an electron donating group (e.g., in a reaction mixture) may be, for example, less than or equal to 10:1, less than or equal to 5:1, less than or equal to 3:1, less than or equal to 2:1, less than or equal to 1.5:1, less than or equal to 1:1, less than or equal to 0.7:1, less than or equal to 0.5:1, less than or equal to 0.2:1, less than or equal to 0.1:1. Combinations of the above-noted ranges are also possible (e.g., a ratio of greater than or equal to 0.1:1 and less than or equal to 1:1). Other ranges are also possible.

It should be appreciated that while the above-noted ranges describe ratios of monomer including an electron withdrawing group to comonomer having an electron donating group, in embodiments in which more than two types of monomers are present (e.g., more than one monomer including an electron withdrawing group and/or more than one comonomer having an electron donating group), different ratios between different monomers may be present. For example, the reaction mixture and/or resulting polymer may have a ratio between a first monomer including an electron withdrawing group to comonomer having an electron donating group that falls within a first range, such as one described above, and the reaction mixture and/or resulting polymer may have a ratio between a second monomer including an electron withdrawing group to the comonomer having the electron donating group that falls within a second range, such as one described above. The first and second ranges may be the same or different.

As described herein, it may be desirable to determine if a polymer formed from a specific monomer/comonomer has advantageous properties as compared to other materials for particular electrochemical systems. Therefore, simple screening tests can be employed to help select between candidate materials. One simple screening test includes positioning a layer of the resulting polymer of the desired chemistry in an electrochemical cell, e.g., as a separator in a cell. The electrochemical cell may then undergo multiple discharge/charge cycles, and the electrochemical cell may be observed for whether inhibitory or other destructive behavior occurs compared to that in a control system. If inhibitory or other destructive behavior is observed during cycling of the cell, as compared to the control system, it may be indicative of hydrolysis, or other possible degradation mechanisms of the polymer, within the assembled electrochemical cell. Using the same electrochemical cell it is also possible to evaluate the electrical conductivity and ion conductivity of the polymer using methods known to one of ordinary skill in the art. The measured values may be compared to select between candidate materials and may be used for comparison with the baseline material in the control.

Another simple screening test to determine if a polymer has suitable mechanical strength may be accomplished using any suitable mechanical testing methods including, but not limited to, durometer testing, yield strength testing using a tensile testing machine, and other appropriate testing methods. In one set of embodiments, the polymer has a yield strength that is greater than or equal to the yield strength of metallic lithium. For example, the yield strength of the polymer may be greater than approximately 1 times, 2 times, 3 times, or 4 times the yield strength of metallic lithium. In some embodiments, the yield strength of the polymer is less than or equal to 10 times, 8 times, 6 times, 5 times, 4 times, or 3 times the yield strength of metallic lithium. Combinations of the above-referenced ranges are also possible. In one specific embodiment, the yield strength of the polymer is greater than approximately 10 kg/cm$^2$ (i.e., approximately 980 kPa). Other yield strengths greater than or less than the above limits are also possible. Other simple tests to characterize the polymers may also be conducted by those of ordinary skill in the art.

Without wishing to be bound by theory, the strength of the resulting polymer at various temperatures may be related to the glass transition temperature. Therefore, in some instances, the glass transition temperature of the polymer may be greater than or equal to approximately 100° C., 110° C., 120° C., 130° C., 140° C., 150° C., or any other appropriate temperature. Further, the glass transition temperature may be less than or equal to approximately 200° C., 190° C., 180° C., 170° C., 160° C., or any other appropriate temperature. For example, the glass transition temperature may be between approximately 120° C. to 200° C. or between approximately 150° C. to 180° C. Other combinations of the above ranges are also possible. In some embodiments, the polymer does not exhibit a glass transition temperature.

A particular problem with lithium sulfur batteries is the thermal runaway which can be observed at elevated temperatures between, e.g., 150 to 230° C. and which leads to complete destruction of the battery. Various methods have been suggested to prevent thermal runaway such as the use of protective layers, including polymer coatings, for protecting the electrodes. However, those methods usually lead to a dramatic reduction in capacity. The loss in capacity has been ascribed—amongst others—to formation of lithium dendrites during recharging, loss of sulfur due formation of soluble lithium sulfides such as $Li_2S_3$, $Li_2S_4$ or $Li_2S_6$, polysulfide shuttle, change of volume during charging or discharging and others.

In some embodiments, the electrochemical cells described herein can be cycled at relatively high temperatures without experiencing thermal runaway. The term "thermal runaway" is understood by those of ordinary skill in the art, and refers to a situation in which the electrochemical cell cannot dissipate the heat generated during charge and discharge sufficiently fast to prevent uncontrolled temperature increases within the cell. Often, a positive feedback loop can be created during thermal runaway (e.g., the electrochemical reaction produces heat, which increases the rate of the electrochemical reaction, which leads to further production of heat), which can cause electrochemical cells to catch fire. In some embodiments, an electrochemical cell can include a polymer described herein (e.g., as part of a polymer layer, optionally as a polymer electrolyte) such that thermal runaway is not observed at relatively high temperatures of operation of the electrochemical cell. Not wishing to be bound by any particular theory, a polymer as described herein may slow down the reaction between the lithium (e.g., metallic lithium) and the cathode active material (e.g., sulphur such as elemental sulfur) in the electrochemical cell, inhibiting (e.g., preventing) thermal runaway from taking place. Also, the polymer may serve as a physical barrier between the lithium and the cathode active material, inhibiting (e.g., preventing) thermal runaway from taking place.

In some embodiments, the polymers described herein may aid in reducing or eliminating thermal runaway. This may be due to the fact that many of the polymers described herein are stable to high temperatures. In some embodiments, the polymers aid in operation of the electrochemical cell (e.g., continuously charged and discharged) at a temperature of up to about 130° C., up to about 150° C., up to about 170° C., up to about 190° C., up to about 210° C., up to about 230° C., up to about 250° C., up to about 270° C., up to about 290° C., up to about 300° C., up to about 320° C., up to about 340° C., up to about 360° C., or up to about 370° C. (e.g., as measured at the external surface of the electrochemical cell) without the electrochemical cell experiencing thermal runaway. In some embodiments, the polymers described herein have a decomposition temperature of greater than about 200° C., greater than about 250° C., greater than about 300° C., or greater than about 350° C., or greater than about 370° C.

In some embodiments, the electrochemical cell can be operated at any of the temperatures outlined above without igniting. In some embodiments, the electrochemical cells described herein can be operated at relatively high temperatures (e.g., any of the temperatures outlined above) without experiencing thermal runaway (e.g., at ambient temperature and pressure) and without employing an auxiliary cooling mechanism (e.g., a heat exchanger external to the electrochemical cell, active fluid cooling external to the electrochemical cell, and the like).

The presence of thermal runaway in an electrochemical cell can be identified by one of ordinary skill in the art. In some embodiments, thermal runaway can be identified by one or more of melted components, diffusion and/or intermixing between components or materials, the presence of certain side products, and/or ignition of the cell.

Prior to copolymerization, the above-disclosed monomer and comonomer may be deposited on a surface using any appropriate deposition technique. For example, a monomer may be deposited by methods such as electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. The monomers may also be deposited by spin-coating, doctor blading, spray coating, and solution casting techniques. Another method for depositing a monomer includes flash evaporation in which a monomer/comonomer solution is flash evaporated in a vacuum and subsequently condensed as a layer on a surface and polymerized. U.S. Pat. No. 4,954,371 to Yializis describes the method in more detail. Flash evaporation may also be used for deposition of polymer layers comprising salts, for example, as described in U.S. Pat. No. 5,681,615 to Affinito et al. The specific technique used for depositing the monomer may depend on the material being deposited, the thickness of the desired layer, and other parameters as would be apparent to one of ordinary skill in the art. After deposition, the copolymerization reaction may be initiated by UV light, electron beam, thermal energy, or any other appropriate energy source.

As described herein, in one particular embodiment, a method for forming a component for use in an electrochemical cell involves depositing onto a surface at least one olefinic monomer comprising at least one electron withdrawing group attached to a double bond and an at least one olefinic comonomer comprising at least one electron donating group attached to a double bond, and polymerizing the monomers using a free radical mechanism to form a polymer layer. In certain embodiments, the olefinic monomer comprising the at least one electron withdrawing group comprises a maleimide or maleic anhydride and the comonomer comprising the at least one electron donating group comprises a vinyl ether.

In embodiments where the one or more monomers are deposited onto a surface (e.g., a metallic surface or a ceramic/glass surface), it may be desirable to include a third monomer (or second comonomer) (e.g., a monomer including an electron withdrawing group, an electron donating group, or neither) having a functional group for tethering the resulting polymer to the surface/substrate. In one embodiment, the molar percentage of a third monomer with respect to a first monomer (e.g., a monomer including an electron withdrawing group), or molar percentage of a third monomer with respect to a second monomer (e.g., a monomer including an electron donating group) in a reaction mixture (e.g., a liquid monomer film) may range from approximately 0.1 molar % to approximately 20 molar %. For example, the percentage of a third monomer with respect to a first monomer or a second monomer may be greater than or equal to 0.1 molar %, greater than or equal to 1 molar %, greater than or equal to 5 molar %, greater than or equal to 10 molar %, or greater than or equal to 15 molar %. In some embodiments, the molar percentage of a third monomer with respect to a first monomer or a second monomer may be less than or equal to 20 molar %, less than or equal to 15 molar %, less than or equal to 10 molar %, less than or equal to 5 molar %, or less than or equal to 1 molar %. Combinations of the above-noted ranges are also possible (e.g., greater than or equal to 0.1 molar % and less than 5 molar %). Other ranges are also possible.

Several non-limiting examples of anchoring groups that can be included in a third monomer for tethering the polymer to a metallic substrate include carboxylic acid, carboxylate, glycidyl groups, maleic anhydride, phosphonic acid ester, sulfonic acid, sulfonic acid esters, thiols, silanes, primary and secondary amino groups, ethoxylated ethers, siloxanes, and anionic groups. Although a third monomer comprising a tethering group has been described, in other embodiments, one of the monomer having an electron withdrawing group and/or the comonomer having an electron donating group may include a functional or anchoring group such as one described above for tethering the resulting polymer to a substrate.

In one particular set of embodiments, a polymer can be formed from the polymerization of the following comonomers: an alkylene glycol divinyl ether (e.g., triethylene glycol divinyl ether), a maleic anhydride, and a maleimide (e.g., N-phenyl maleimide). A maleic anhydride may be used to tether the resulting polymer to a substrate. A representative polymer is shown below.

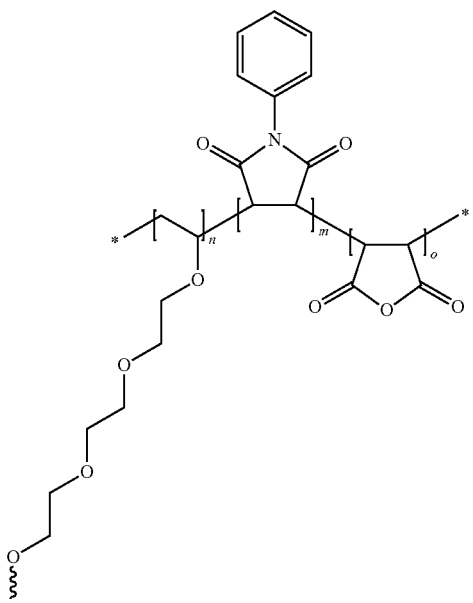

In some embodiments, each of n and m may be, independently, greater than or equal to approximately 1, 2, 3, 4, 5, 6, 7, 8, 9, 10, 20, 30, 40, 50, 60, 70, or any other suitable value. Further, each of n and m may be, independently, less than or equal to approximately 100, 90, 80, 70, 60, 50, 40, 30, 20, 10, 9, 8, 7, 6, 5, or any other suitable value. For example, each of n and m may be, independently, between approximately 1 and 100 in some embodiments, or between approximately 1 and 10 in other embodiments. Other combinations of the above-referenced ranges are also possible.

In some embodiments, the ratio of n:(m+o) is about 1:1. In some embodiments the ratio of n:(m+o) is greater than 1:1 (e.g., greater than or equal to 1.5:1, greater than or equal to 2:1, greater than or equal to 3:1, greater than or equal to 5:1). In other embodiments, the ratio of n:(m+o) is less than 1:1 (e.g., less than or equal to 0.8:1, less than or equal to 0.6:1, less than or equal to 0.4:1, or less than or equal to 0.2:1). Other ranges are also possible.

In the polymer shown above, it should be appreciated that derivatives of the structural units denoted by n (e.g., the alkylene glycol divinyl ether), the structural units denoted by m (e.g., the maleimide), and/or the structural units denoted by o (e.g., the maleic anhydride) may be possible, and that the polymer need not include the specific structural units shown above. Additionally, it should be appreciated that in certain embodiments, the structural units denoted by n, and structural units denoted by either m or o, are alternating with respect to one another in the polymer chain.

In some embodiments, it may be beneficial to include a spacer group between the monomer including the electron withdrawing group and the comonomer including the electron donating group. Examples of possible spacer groups include, but are not limited to, polyethylene oxide, polyethylene glycol, polypropylene oxide, and polybutylene oxide. Without wishing to be bound by theory, the inclusion of the above spacer groups may result in increased ionic conductivity and/or improved flexibility of the resulting polymer. Additionally, benefits associated specifically with the inclusion of polyethylene glycol may include a low toxicity compared to other chemicals and/or a high viscosity which may allow for the application of thin layers. In some embodiments, the spacer group is in the form of a polymer and includes a structural unit (e.g., repeat unit). In other embodiments, the spacer group does not include a structural unit (e.g., repeat unit). The spacer group may be randomly or non-randomly inserted between one or more types of monomers of the polymer.

While specific monomers and comonomers have been described above with regards to general classes of compounds, specific compounds, and associated functional groups, it is also possible to describe the monomer and comonomer as being electron rich and electron poor partners which may be polymerized, e.g., by a radical polymerization process. One such way to describe the monomer and comonomer includes, but is not limited to, Q-e scheme of the monomer and comonomer. Without wishing to be bound by theory, the Q-e scheme is related to the polarizations and reactivities of the monomer and comonomer. For example, Q generally refers to the reactivity of a monomer/comonomer with higher values of Q indicating a more reactive monomer as compared to lower values of Q. e values generally refer to the polarization of the monomer/comonomer with positive values of e indicating an electron poor carbon double bond and negative values indicating an electron rich carbon double bond. Without wishing to be bound by theory, in some embodiments, the e value is a constant and the Q-e scheme can be applied more to the transition state or the radical of the monomer rather than the monomer itself.

In one embodiment, the Q-e scheme of the monomer comprising the at least one electron withdrawing group (e.g., at least one electron withdrawing group attached to a double bond) is $e>0$ and $Q<0.1$ and the Q-e scheme of the comonomer comprising the at least one electron donating group (e.g., at least one electron donating group attached to a double bond) is $e<0$ a and $Q>0.1$. In another embodiment, the Q-e scheme of the monomer comprising the at least one electron withdrawing group (e.g., at least one electron withdrawing group attached to a double bond) is $e>0$ and $Q>0.1$ and the Q-e scheme of the comonomer comprising the at least one electron donating group (e.g., at least one electron donating group attached to a double bond) is $e<0$ a and $Q<0.1$. In some instances, the Q values of the monomer comprising the at least one electron withdrawing group and the comonomer comprising the at least one electron donating group are approximately equal.

The term "aliphatic", as used herein, includes both saturated and unsaturated, straight chain (i.e., unbranched), branched, acyclic, cyclic, or polycyclic aliphatic hydrocarbons, which are optionally substituted with one or more functional groups. As will be appreciated by one of ordinary skill in the art, "aliphatic" is intended herein to include, but is not limited to, alkyl, alkenyl, alkynyl, cycloalkyl, cycloalkenyl, and cycloalkynyl moieties. Thus, as used herein, the term "alkyl" includes straight, branched and cyclic alkyl groups. An analogous convention applies to other generic terms such as "alkenyl", "alkynyl", and the like. Furthermore, as used herein, the terms "alkyl", "alkenyl", "alkynyl", and the like encompass both substituted and unsubstituted groups. In certain embodiments, as used herein, "lower alkyl" is used to indicate those alkyl groups (cyclic, acyclic, substituted, unsubstituted, branched or unbranched) having 1-6 carbon atoms.

In certain embodiments, the alkyl, alkenyl, and alkynyl groups employed in the compounds described herein contain 1-20 aliphatic carbon atoms. For example, in some embodiments, an alkyl, alkenyl, or alkynyl group may have greater than or equal to 2 carbon atoms, greater than or equal to 4 carbon atoms, greater than or equal to 6 carbon atoms, greater than or equal to 8 carbon atoms, greater than or equal to 10 carbon atoms, greater than or equal to 12 carbon atoms, greater than or equal to 14 carbon atoms, greater than or equal to 16 carbon atoms, or greater than or equal to 18 carbon atoms. In some embodiments, an alkyl, alkenyl, or alkynyl group may have less than or equal to 20 carbon atoms, less than or equal to 18 carbon atoms, less than or equal to 16 carbon atoms, less than or equal to 14 carbon atoms, less than or equal to 12 carbon atoms, less than or equal to 10 carbon atoms, less than or equal to 8 carbon atoms, less than or equal to 6 carbon atoms, less than or equal to 4 carbon atoms, or less than or equal to 2 carbon atoms. Combinations of the above-noted ranges are also possible (e.g., greater than or equal to 2 carbon atoms and less than or equal to 6 carbon atoms). Other ranges are also possible.

Illustrative aliphatic groups include, but are not limited to, for example, methyl, ethyl, n-propyl, isopropyl, cyclopropyl, —$CH_2$-cyclopropyl, vinyl, allyl, n-butyl, sec-butyl, isobutyl, tert-butyl, cyclobutyl, —$CH_2$-cyclobutyl, n-pentyl, sec-pentyl, isopentyl, tert-pentyl, cyclopentyl, —$CH_2$-cyclopentyl, n-hexyl, sec-hexyl, cyclohexyl, —$CH_2$-cyclohexyl moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl, and the like.

The term "alkoxy", or "thioalkyl" as used herein refers to an alkyl group, as previously defined, attached to the parent molecule through an oxygen atom or through a sulfur atom. In certain embodiments, the alkoxy or thioalkyl groups contain a range of carbon atoms, such as the ranges of carbon atoms described herein with respect to the alkyl, alkenyl, or alkynyl groups. Examples of alkoxy, include but are not limited to, methoxy, ethoxy, propoxy, isopropoxy, n-butoxy, tert-butoxy, neopentoxy, and n-hexoxy. Examples of thioalkyl include, but are not limited to, methylthio, ethylthio, propylthio, isopropylthio, n-butylthio, and the like.

The term "alkylamino" refers to a group having the structure —NHR', wherein R' is aliphatic, as defined herein. In some cases, R' may be $R_1$ or $R_2$, as described herein. In certain embodiments, the alkylamino groups contain a range of carbon atoms, such as the ranges of carbon atoms described herein with respect to the alkyl, alkenyl, or alkynyl groups. Examples of alkylamino groups include, but are not limited to, methylamino, ethylamino, n-propylamino, iso-propylamino, cyclopropylamino, n-butylamino, tert-butylamino, neopentylamino, n-pentylamino, hexylamino, cyclohexylamino, and the like.

The term "dialkylamino" refers to a group having the structure —NRR', wherein R and R' are each an aliphatic group, as defined herein. In some cases, R and R' may be $R_1$ or $R_2$, as described herein. R and R' may be the same or different in an dialkyamino moiety. In certain embodiments, the dialkylamino groups contain a range of carbon atoms, such as the ranges of carbon atoms described herein with respect to the alkyl, alkenyl, or alkynyl groups. Examples of dialkylamino groups include, but are not limited to, dimethylamino, methyl ethylamino, diethylamino, methylpropylamino, di(n-propyl)amino, di(iso-propyl)amino, di(cyclopropyl)amino, di(n-butyl)amino, di(tert-butyl)amino, di(neopentyl)amino, di(n-pentyl)amino, di(hexyl)amino, di(cyclohexyl)amino, and the like. In certain embodiments, R and R' are linked to form a cyclic structure. The resulting cyclic structure may be aromatic or non-aromatic. Examples of cyclic diaminoalkyl groups include, but are not limited to, aziridinyl, pyrrolidinyl, piperidinyl, morpholinyl, pyrrolyl, imidazolyl, 1,3,4-trianolyl, and tetrazolyl.

Some examples of substituents of the above-described aliphatic (and other) moieties of compounds of the invention include, but are not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; F; Cl; Br; I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$ wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

In general, the terms "aryl" and "heteroaryl", as used herein, refer to stable mono- or polycyclic, heterocyclic, polycyclic, and polyheterocyclic unsaturated moieties having preferably 3-14 carbon atoms, each of which may be substituted or unsubstituted. Substituents include, but are not limited to, any of the previously mentioned substituents, i.e., the substituents recited for aliphatic moieties, or for other moieties as disclosed herein, resulting in the formation of a stable compound. In certain embodiments described herein, "aryl" refers to a mono- or bicyclic carbocyclic ring system having one or two aromatic rings including, but not limited to, phenyl, naphthyl, tetrahydronaphthyl, indanyl, indenyl, and the like. In certain embodiments, the term "heteroaryl", as used herein, refers to a cyclic aromatic radical having from five to ten ring atoms of which one ring atom is selected from S, O, and N; zero, one, or two ring atoms are additional heteroatoms independently selected from S, O, and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

It will be appreciated that aryl and heteroaryl groups can be unsubstituted or substituted, wherein substitution includes replacement of one, two, three, or more of the hydrogen atoms thereon independently with any one or more of the following moieties including, but not limited to: aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$, wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "cycloalkyl", as used herein, refers specifically to groups having three to seven, preferably three to ten carbon atoms. Suitable cycloalkyls include, but are not limited to cyclopropyl, cyclobutyl, cyclopentyl, cyclohexyl, cycloheptyl and the like, which, as in the case of other aliphatic, heteroaliphatic, or heterocyclic moieties, may optionally be substituted with substituents including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$, wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The term "heteroaliphatic", as used herein, refers to aliphatic moieties that contain one or more oxygen, sulfur, nitrogen, phosphorus, or silicon atoms, e.g., in place of carbon atoms. Heteroaliphatic moieties may be branched, unbranched, cyclic or acyclic and include saturated and unsaturated heterocycles such as morpholino, pyrrolidinyl, etc. In certain embodiments, heteroaliphatic moieties are substituted by independent replacement of one or more of the hydrogen atoms thereon with one or more moieties including, but not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$CC(O)R_x$; —$OCO_2R_x$; —$OCON(R_x)_2$; —$N(R_x)_2$; —$S(O)_2R_x$; —$NR_x(CO)R_x$, wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples that are described herein.

The terms "halo" and "halogen" as used herein refer to an atom selected from fluorine, chlorine, bromine, and iodine.

The term "haloalkyl" denotes an alkyl group, as defined above, having one, two, or three halogen atoms attached thereto and is exemplified by such groups as chloromethyl, bromoethyl, trifluoromethyl, and the like.

The term "heterocycloalkyl" or "heterocycle", as used herein, refers to a non-aromatic 5-, 6-, or 7-membered ring or a polycyclic group, including, but not limited to a bi- or tri-cyclic group comprising fused six-membered rings having between one and three heteroatoms independently selected from oxygen, sulfur and nitrogen, wherein (i) each 5-membered ring has 0 to 1 double bonds and each 6-membered ring has 0 to 2 double bonds, (ii) the nitrogen and sulfur heteroatoms may be optionally be oxidized, (iii) the nitrogen heteroatom may optionally be quaternized, and (iv) any of the above heterocyclic rings may be fused to a benzene ring. Representative heterocycles include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl. In certain embodiments, a "substituted heterocycloalkyl or heterocycle" group is utilized and as used herein, refers to a heterocycloalkyl or heterocycle group, as defined above, substituted by the independent replacement of one, two or three of the hydrogen atoms thereon with but are not limited to aliphatic; heteroaliphatic; aryl; heteroaryl; arylalkyl; heteroarylalkyl; alkoxy; aryloxy; heteroalkoxy; heteroaryloxy; alkylthio; arylthio; heteroalkylthio; heteroarylthio; —F; —Cl; —Br; —I; —OH; —$NO_2$; —CN; —$CF_3$; —$CH_2CF_3$; —$CHCl_2$; —$CH_2OH$; —$CH_2CH_2OH$; —$CH_2NH_2$; —$CH_2SO_2CH_3$; —$C(O)R_x$; —$CO_2(R_x)$; —$CON(R_x)_2$; —$OC(O)R_x$; —$OCO_2R_x$; —$OCON(R_x)_2$; —$N(R_x)_2$; —$S(O)_2R_x$; —$NR_x(CO)R_x$, wherein each occurrence of $R_x$ independently includes, but is not limited to, aliphatic, heteroaliphatic, aryl, heteroaryl, arylalkyl, or heteroarylalkyl, wherein any of the aliphatic, heteroaliphatic, arylalkyl, or heteroarylalkyl substituents described above and herein may be substituted or unsubstituted, branched or unbranched, cyclic or acyclic, and wherein any of the aryl or heteroaryl substituents described above and herein may be substituted or unsubstituted. Additional examples of generally applicable substituents are illustrated by the specific embodiments shown in the Examples which are described herein.

The term "independently selected" is used herein to indicate that the R groups can be identical or different.

The layer formed by or including a polymer composition described herein (e.g., a polymer layer) may have any suitable thickness. In some embodiments, the thickness may vary over a range from about 0.1 microns to about 10 microns. For instance, the thickness of the layer may be between 0.05-0.15 microns thick, between 0.1-1 microns thick, between 1-5 microns thick, or between 5-10 microns thick. The thickness of a layer may be, for example, less than or equal to 10 microns, less than or equal to 5 microns, less than or equal to 2.5 microns, less than or equal to 1 micron, less than or equal to 500 nm, less than or equal to 250 nm, less than or equal to 100 nm, less than or equal to 50 nm, less than or equal to 25 nm, or less than or equal to 10 nm. In certain embodiments, the layer may have a thickness of greater than 10 nm, greater than 25 nm, greater than 50 nm, greater than 100 nm, greater than 250 nm, greater than 500 nm, greater than 1 micron, greater than 1.5 microns. Other thicknesses are also possible. Combinations of the above-noted ranges are also possible (e.g., a thickness of greater than 10 nm and less than or equal to 1 micron). The disclosed polymer compositions may be deposited using any of the above disclosed methods.

The dry state ion conductivity (i.e., the ion conductivity of the material when not swollen with an electrolyte) of the layer(s) comprising one or more polymers described herein may vary over a range of, for example, from about $10^{-8}$ S/cm to about $10^{-4}$ S/cm. In other embodiments, the dry state ion conductivity may vary over a range from about $10^{-10}$ S/cm to about $10^{-4}$ S/cm. In some embodiments, the dry state ion conductivity may be, for example, less than or equal to $10^{-4}$ S/cm, less than or equal to $10^{-5}$ S/cm, less than or equal to $10^{-6}$ S/cm, or less than or equal to $10^{-7}$ S/cm. In certain embodiments, the dry state ion conductivity may be greater than or equal to $10^{-10}$ S/cm, $10^{-9}$ S/cm, $10^{-8}$ S/cm, greater than or equal to $10^{-7}$ S/cm, greater than or equal to $10^{-6}$ S/cm, or greater than or equal to $10^{-5}$ S/cm. Combinations of the above-referenced ranges are also possible (e.g., a dry state ion conductivity of greater than or equal to $10^{-8}$ S/cm and less than or equal to $10^{-4}$ S/cm). Other dry state ion conductivities are also possible.

As shown in FIG. 1, in one set of embodiments, an article for use in an electrochemical cell may include an ion-conductive layer. In some embodiments, the –ion conductive layer is a ceramic layer, a glassy layer, or a glassy-ceramic layer, e.g., an ion conducting ceramic/glass conductive to lithium ions. Suitable glasses and/or ceramics include, but are not limited to, those that may be characterized as containing a "modifier" portion and a "network" portion, as known in the art. The modifier may include a metal oxide of the metal ion conductive in the glass or ceramic. The network portion may include a metal chalcogenide such as, for example, a metal oxide or sulfide. For lithium metal and other lithium-containing electrodes, an ion conductive layer may be lithiated or contain lithium to allow passage of lithium ions across it. Ion conductive layers may include layers comprising a material such as lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. The selection of the ion conducting material will be dependent on a number of factors including, but not limited to, the properties of electrolyte and cathode used in the cell.

In one set of embodiments, the ion conductive layer is a non-electroactive metal layer. The non-electroactive metal layer may comprise a metal alloy layer, e.g., a lithiated metal layer especially in the case where a lithium anode is employed. The lithium content of the metal alloy layer may vary from about 0.5% by weight to about 20% by weight, depending, for example, on the specific choice of metal, the desired lithium ion conductivity, and the desired flexibility of the metal alloy layer. Suitable metals for use in the ion conductive material include, but are not limited to, Al, Zn, Mg, Ag, Pb, Cd, Bi, Ga, In, Ge, Sb, As, and Sn. Sometimes, a combination of metals, such as the ones listed above, may be used in an ion conductive material.

The thickness of a ion conductive material layer (e.g., within a multi-layered structure) may vary over a range from about 1 nm to about 10 microns. For instance, the thickness of the ion conductive material layer may be between 1-10 nm thick, between 10-100 nm thick, between 100-1000 nm thick, between 1-5 microns thick, or between 5-10 microns thick. In some embodiments, the thickness of an ion conductive material layer may be, for example, less than or equal to 10 microns, less than or equal to 5 microns, less than or equal to 1000 nm, less than or equal to 500 nm, less than or equal to 250 nm, less than or equal to 100 nm, less than or equal to 50 nm, less than or equal to 25 nm, or less than or equal to 10 nm. In certain embodiments, the ion conductive layer may have a thickness of greater than or equal to 10 nm, greater than or equal to 25 nm, greater than or equal to 50 nm, greater than or equal to 100 nm, greater than or equal to 250 nm, greater than or equal to 500 nm, greater than or equal to 1000 nm, or greater than or equal to 1500 nm. Combinations of the above-referenced ranges are also possible (e.g., a thickness of greater than or equal to 10 nm and less than or equal to 500 nm). Other thicknesses are also possible. In some cases, the ion conductive layer has the same thickness as a polymer layer in a multi-layered structure.

The ion conductive layer may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc.

In some embodiments, the ion conductive material is non-polymeric. In certain embodiments, the ion conductive material is defined in part or in whole by a layer that is highly conductive toward lithium ions (or other ions) and minimally conductive toward electrons. In other words, the ion conductive material may be one selected to allow certain ions, such as lithium ions, to pass across the layer, but to impede electrons, from passing across the layer. In some embodiments, the ion conductive material forms a layer that allows only a single ionic species to pass across the layer (i.e., the layer may be a single-ion conductive layer). In other embodiments, the ion conductive material may be substantially conductive to electrons.

In one set of embodiments, the ion conductive layer is a ceramic layer, a glassy layer, or a glassy-ceramic layer, e.g., an ion-conducting glass conductive to ions (e.g., lithium ions). For lithium metal and other lithium-containing electrodes, an ion conductive layer may be lithiated or contain lithium to allow passage of lithium ions across it. Ion conductive layers may include layers comprising a material such as lithium nitrides, lithium silicates, lithium borates, lithium aluminates, lithium phosphates, lithium phosphorus oxynitrides, lithium silicosulfides, lithium germanosulfides, lithium oxides (e.g., $Li_2O$, LiO, $LiO_2$, $LiRO_2$, where R is a rare earth metal), lithium lanthanum oxides, lithium titanium oxides, lithium borosulfides, lithium aluminosulfides, and lithium phosphosulfides, and combinations thereof. The selection of the ion conducting material will be dependent on a number of factors including, but not limited to, the properties of electrolyte and cathode used in the cell.

The ion conductive layer may be formed using plasma conversion based techniques, electron beam evaporation, magnetron sputtering, chemical vapor deposition, and any other appropriate formation technique, deposition technique, and/or any appropriate combination thereof. Alternatively, the layer of electroactive material may be exposed to a gas, such as nitrogen, under suitable conditions to react with the electroactive material at the surface of the electroactive material layer to form the ion conductive layer.

The noted conversion and/or deposition processes may be performed at any suitable temperature and pressure. However, in some embodiments, the process is performed at a temperature less than the melting temperature of the underlying substrate. In some embodiments, the temperature may be, for example, less than 180° C., less than 150° C., less than 120° C., less than 100° C., less than 80° C., less than 60° C., or less than 40° C. In certain embodiments, the temperature may be greater than 40° C., greater than 60° C., greater than 80° C., greater than 100° C., greater than 120° C., or greater than 150° C. Other temperatures are also possible. Combinations of the above-noted ranges are also possible.

The thickness of a ion conductive material layer may vary over a range from about 1 nm to about 10 microns. For instance, the thickness of the ion conductive material layer may be between 1-10 nm thick, between 10-100 nm thick, between 100-1000 nm thick, between 1-5 microns thick, or between 5-10 microns thick. In some embodiments, the thickness of a ion conductive material layer may be no greater than, e.g., 10 microns thick, no greater than 5 microns thick, no greater than 1000 nm thick, no greater than 500 nm thick, no greater than 250 nm thick, no greater than 100 nm thick, no greater than 50 nm thick, no greater than 25 nm thick, or no greater than 10 nm thick. In certain embodiments, the ion conductive layer may have a thickness of greater than 10 nm, greater than 25 nm, greater than 50 nm, greater than 100 nm, greater than 250 nm, greater than 500 nm, greater than 1000 nm, or greater than 1500 nm. Other thicknesses are also possible. Combinations of the above-noted ranges are also possible. In some cases, the ion conductive layer has the same thickness as a polymer layer in a multi-layered structure.

The ion conductive layer may be deposited by any suitable method such as sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition. The technique used may depend on the type of material being deposited, the thickness of the layer, etc.

In addition to the structures depicted in FIG. 1, the electrochemical cell may include a structure including one or more layers comprising the disclosed polymer and/or one or more layers of an ion conductive material positioned between the active surface of the electroactive material and the corresponding electrolyte of the cell. The one or more layers comprising the polymer and/or one or more ion conductive materials may form a multi-layered structure as described herein.

One advantage of a multi-layered structure includes the mechanical properties of the structure. The positioning of a polymer layer adjacent an ion conductive layer can decrease the tendency of the ion conductive layer to crack, and can increase the barrier properties of the structure. Thus, these laminates or composite structures may be more robust towards stress due to handling during the manufacturing process than structures without intervening polymer layers. In addition, a multi-layered structure can also have an increased tolerance of the volumetric changes that accompany the migration of lithium back and forth from the anode during the cycles of discharge and charge of the cell.

Figure 2A:
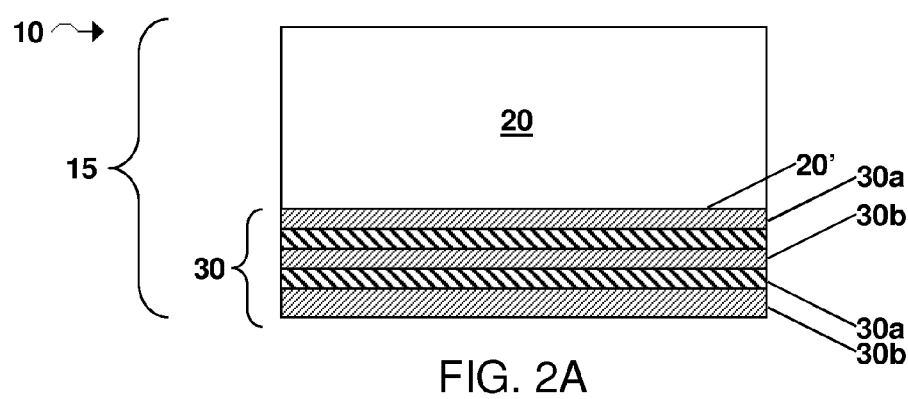
FIG. 2A shows an electrode including an electroactive layer and a polymer layer according to one set of embodiments.

One structure corresponding to such an embodiment is depicted in FIG. 2A. In the depicted embodiment, article 10 includes an anode 15 comprising an electroactive layer 20. The electroactive layer comprises an electroactive material (e.g., lithium metal). In certain embodiments, the electroactive layer is covered by structure 30. As shown in the illustrative embodiment, structure 30 is disposed on the electroactive layer 20 and is a multi-layered structure including at least a first ion conductive material layer 30b and at least a first layer 30a formed from or including one or more of the polymers disclosed herein and positioned adjacent the ion conductive material. In this embodiment, the multi-layered structure can optionally include several sets of alternating ion conductive material layers 30a and layers 30b. The multi-layered structures can allow passage of, for example, lithium ions, while limiting passage of certain chemical species that may adversely affect the anode (e.g., species in the electrolyte). This arrangement can provide significant advantage, as the polymers can be selected to impart flexibility to the system where it can be needed most, namely, at the surface of the electrode where morphological changes occur upon charge and discharge.

Figure 2B:
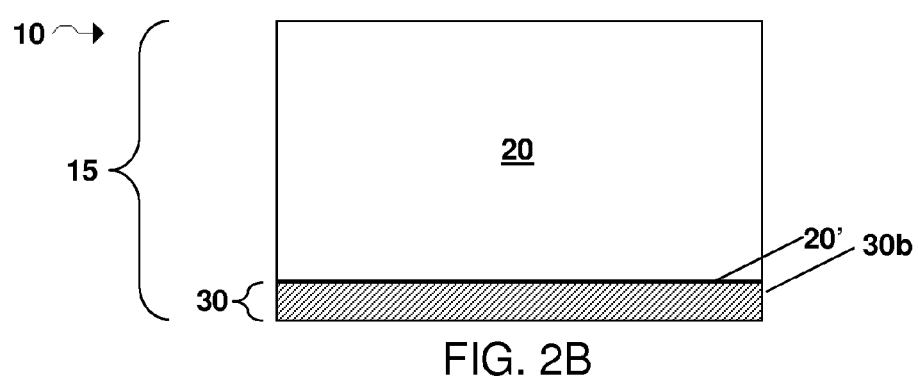
FIG. 2B shows an electrode including an electroactive layer a multilayer protective structure according to one set of embodiments.

In other embodiments, as depicted in FIG. 2B, the electroactive layer may be covered by structure 30 formed from a single layer 30b. Layer 30b may be formed from or comprise one or more of the polymers disclosed herein and may be disposed on active surface 20' of the electroactive layer.

A multi-layered structure may have various overall thicknesses that can depend on, for example, the electrolyte, the cathode, or the particular use of the electrochemical cell. In some cases, a multi-layered structure can have an overall thickness less than or equal to 1 mm, less than or equal to 700 microns, less than or equal to 300 microns, less than or equal to 250 microns, less than or equal to 200 microns, less than or equal to 150 microns, less than or equal to 100 microns, less than or equal to 75 microns, less than or equal to 50 microns, less than or equal to 20 microns, less than or equal to 10 microns, less than or equal to 5 microns, or less than or equal to 2 microns. In certain embodiments, the multi-layered structure may have a thickness of greater than 100 nm, greater than 250 nm, greater than 500 nm, greater than 1 micron, greater than 2 microns, greater than 5 microns, greater than 10 microns, or greater than 20 microns. Other thicknesses are also possible. Combinations of the above-noted ranges are also possible.

Examples of multi-layered structures are described in more detail in U.S. patent application Ser. No. 11/400,025, issued as U.S. Pat. No. 7,771,870, and entitled "Electrode Protection in both Aqueous and Non-Aqueous Electrochemical Cells, including Rechargeable Lithium Batteries", which is incorporated herein by reference in its entirety for all purposes.

Figure 3:
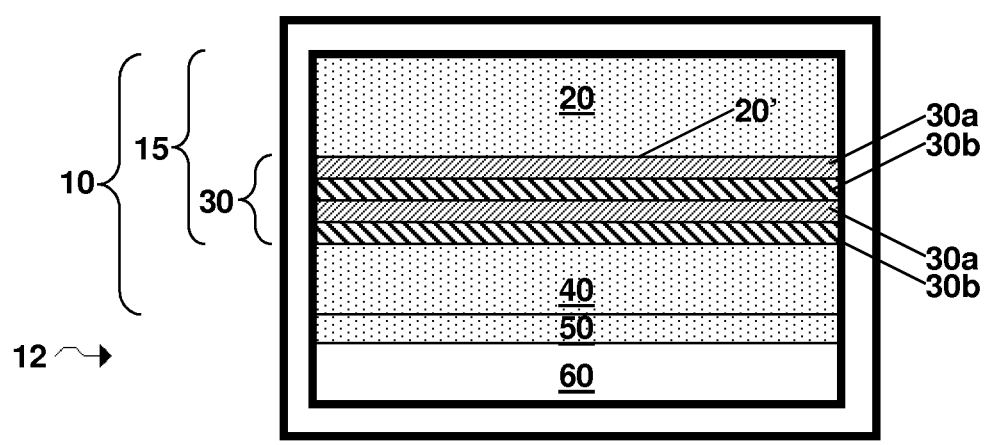
FIG. 3 shows an electrochemical cell according to one set of embodiments.

As shown in the embodiment illustrated in FIG. 3, article 10 may be incorporated with other components to form an electrochemical cell 12. The electrochemical cell may optionally include a separator 50 positioned adjacent or within the electrolyte. The electrochemical cell may further include a cathode 60 comprising a cathode active material. Similar to above, a protective structure 30 may be incorporated between the electroactive layer 20 and the electrolyte layer 40 and cathode 60. In the illustrative embodiment of FIG. 3, protective structure 30 comprises a plurality of ion conductive layers 30a and layers 30b. The ion conductive layers 30a and layers 30b are arranged in an alternating pattern. The layers 30b may be formed from or may comprise one or more of the polymer compositions disclosed herein. While four separate layers have been depicted, it should be appreciated that any suitable number of desired layers could be used (e.g., 5, 6, 7, 8 separate layers).

In one set of embodiments, electroactive layer 20 includes lithium (e.g., lithium metal). However, the current disclosure is not limited to the specific active materials disclosed herein. Instead, the current disclosure should be viewed broadly as disclosing protective structures for use in any number of electrochemical cells of varying chemistry.

In another set of embodiments, electrolyte layer 40, as shown illustratively in FIG. 3, may comprise a polymer gel formed from the polymers disclosed herein. As known to those of ordinary skill in the art, when a solvent is added to a polymer and the polymer is swollen in the solvent to form a gel, the polymer gel is more easily deformed (and, thus, has a lower yield strength) than the polymer absent the solvent. The yield strength of a particular polymer gel may depend on a variety of factors such as the chemical composition of the polymer, the molecular weight of the polymer, the degree of crosslinking of the polymer if any, the thickness of the polymer gel layer, the chemical composition of the solvent used to swell the polymer, the amount of solvent in the polymer gel, any additives such as salts added to the polymer gel, the concentration of any such additives, and the presence of any cathode discharge products in the polymer gel.

In some embodiments, the polymer gel is formed by swelling at least a portion of the polymer in a solvent to form the gel. The polymers may be swollen in any appropriate solvent. The solvent may include, for example, dimethylacetamide (DMAc), N-methylpyrolidone (NMP), dimethylsulfoxide (DMSO), dimethylformamide (DMF), sulfolanes, sulfones, and/or any other appropriate solvent. In certain embodiments, the polymer may be swollen in a solvent mixture comprising a solvent having affinity to polymer and also solvents having no affinity to the polymer (so-called non-solvents) such as, for PVOH, 1,2.dimethoxyethane (DME), diglyme, triglyme, 1.3-dioxolane (DOL), THF, 1,4-dioxane, cyclic and linear ethers, esters (carbonates such as dimethylcarbonate and ethylene carbonate), acetals and ketals. The solvents for preparing the polymer gel may be selected from the solvents described herein and may comprise electrolyte salts, including lithium salts selected from the lithium salts described herein.

In some embodiments, a polymer layer (e.g., a protective polymer layer or a polymer gel layer) and/or an electrolyte may include one or more ionic electrolyte salts (e.g., dissolved ionic salts), also as known in the art, to increase the ionic conductivity. Examples of ionic electrolyte salts include, but are not limited to, LiTFSI, LiFSI, LiI, $LiPF_6$, $LiAsF_6$, LiBOB, derivatives thereof, and other appropriate salts. In some embodiments, the polymer layer comprises a polymer that includes a lithium-containing group such as a lithium salt (e.g., in one or more of its R groups, such as $R_1$ and/or $R_2$), as described herein.

The gel state ion conductivity (i.e. the ion conductivity of the material when swollen with an electrolyte) of the polymer layers may vary over a range from, for example, about $10^{-7}$ S/cm to about $10^{-3}$ S/cm. In some embodiments, the gel state ion conductivity may be, for example, less than or equal to $10^{-3}$ S/cm, less than or equal to $10^{-4}$ S/cm, less than or equal to $10^{-5}$ S/cm. In certain embodiments, the gel state ion conductivity may be greater than or equal to $10^{-7}$ S/cm, greater than or equal to $10^{-6}$ S/cm, greater than or equal to $10^{-5}$ S/cm, greater than or equal to $10^{-4}$ S/cm. Combinations of the above-referenced ranges are also possible (e.g., a gel state ion conductivity of greater than or equal to greater than or equal to $10^{-7}$ S/cm and less than or equal to $10^{-3}$ S/cm). Other gel state ion conductivities are also possible.

As shown illustratively in FIG. 3, an electrochemical cell or an article for use in an electrochemical cell may include a cathode active material layer. Suitable electroactive materials for use as cathode active materials in the cathode of the electrochemical cells described herein may include, but are not limited to, electroactive transition metal chalcogenides, electroactive conductive polymers, sulfur, carbon and/or combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, a cathode includes one or more of the following materials: manganese dioxide, iodine, silver chromate, silver oxide and vanadium pentoxide, copper oxide, copper oxyphosphate, lead sulfide, copper sulfide, iron sulfide, lead bismuthate, bismuth trioxide, cobalt dioxide, copper chloride, manganese dioxide, and carbon. In another embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Examples of conductive polymers include polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

Suitable electroactive materials for use as anode active materials in the electrochemical cells described herein include, but are not limited to, lithium metal such as lithium foil and lithium deposited onto a conductive substrate, and lithium alloys (e.g., lithium-aluminum alloys and lithium-tin alloys). While these are preferred materials, other cell chemistries are also contemplated. In some embodiments, the anode may comprise one or more binder materials (e.g., polymers, etc.).

The articles described herein may further comprise a substrate, as is known in the art. Substrates are useful as a support on which to deposit the anode active material, and may provide additional stability for handling of thin lithium film anodes during cell fabrication. Further, in the case of conductive substrates, a substrate may also function as a current collector useful in efficiently collecting the electrical current generated throughout the anode and in providing an efficient surface for attachment of electrical contacts leading to an external circuit. A wide range of substrates are known in the art of anodes. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. In other embodiments, described more fully below, the substrate may be selected from non-electrically-conductive materials.

The electrolytes used in electrochemical or battery cells can function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material facilitates the transport of ions (e.g., lithium ions) between the anode and the cathode. The electrolyte is electronically non-conductive to prevent short circuiting between the anode and the cathode. In some embodiments, the electrolyte may comprise a non-solid electrolyte.

In some embodiments, an electrolyte layer described herein may have a thickness of at least 1 micron, at least 5 microns, at least 10 microns, at least 15 microns, at least 20 microns, at least 25 microns, at least 30 microns, at least 40 microns, at least 50 microns, at least 70 microns, at least 100 microns, at least 200 microns, at least 500 microns, or at least 1 mm. In some embodiments, the thickness of the electrolyte layer is less than or equal to 1 mm, less than or equal to 500 microns, less than or equal to 200 microns, less than or equal to 100 microns, less than or equal to 70 microns, less than or equal to 50 microns, less than or equal to 40 microns, less than or equal to 30 microns, less than or equal to 20 microns, less than or equal to 10 microns, or less than or equal to 50 microns. Other values are also possible. Combinations of the above-noted ranges are also possible.

The electrolyte can comprise one or more ionic electrolyte salts to provide ionic conductivity and one or more liquid electrolyte solvents, gel polymer materials, or polymer materials. Suitable non-aqueous electrolytes may include organic electrolytes comprising one or more materials selected from the group consisting of liquid electrolytes, gel polymer electrolytes, and solid polymer electrolytes. Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, acyclic ethers, cyclic ethers, glymes, polyethers, phosphate esters, siloxanes, dioxolanes, N-alkylpyrrolidones, substituted forms of the foregoing, and blends thereof. Examples of acyclic ethers that may be used include, but are not limited to, diethyl ether, dipropyl ether, dibutyl ether, dimethoxymethane, trimethoxymethane, dimethoxyethane, diethoxyethane, 1,2-dimethoxypropane, and 1,3-dimethoxypropane. Examples of cyclic ethers that may be used include, but are not limited to, tetrahydrofuran, tetrahydropyran, 2-methyltetrahydrofuran, 1,4-dioxane, 1,3-dioxolane, and trioxane. Examples of polyethers that may be used include, but are not limited to, diethylene glycol dimethyl ether (diglyme), triethylene glycol dimethyl ether (triglyme), tetraethylene glycol dimethyl ether (tetraglyme), higher glymes, ethylene glycol divinyl ether, diethylene glycol divinyl ether, triethylene glycol divinyl ether, dipropylene glycol dimethyl ether, and butylene glycol ethers. Examples of sulfones that may be used include, but are not limited to, sulfolane, 3-methyl sulfolane, and 3-sulfolene. Fluorinated derivatives of the foregoing are also useful as liquid electrolyte solvents. Mixtures of the solvents described herein can also be used.

EXAMPLES

Example 1

This example shows the polymerization of comonomers triethylene glycol divinyl ether and N-phenyl maleimide. Testing was conducted to determine the dry state conductivity and other properties of the resulting polymer.

A solution of 20.23 g triethylene glycol divinyl ether and 17.32 g N-phenyl maleimide was dissolved in 38 g methyl ethyl ketone (MEK) together with 0.75 g Irgacure 819 and 2.63 g of the electrolyte solution. The electrolyte solution consisted of one part 1,3-dioxolane (DOL) and one part dimethoxyethane (DME) with 8-16% LiTFSI, 2-8% LiNO3, 0-1% guanidinium nitrate and 0-0.4% pyridinium nitrate. The solution was cast on a polymer substrate via doctor blading for determination of dry state conductivities. The coated substrate was quickly transferred into a belt conveyor where it was cured by UV light from a broad band mercury lamp which provided a dose of 2500 mJ/cm$^2$ over a duration of approximately 20 seconds. The polymer film was carefully dried in an oven under vacuum. The resulting film thicknesses prepared in this way were in the range of 1-50 μm.

Electrochemical characterization was performed using a Hiresta-UP model MCP-HT 450. The testing procedure involved using a four-point probe to measure the resistance, surface resistivity, and volume resistivity. From these measurements and the thickness of the film, dry conductivities were calculated. The measured dry state conductivity varied from approximately $10^{-8}$ S/cm to as low as $10^{-12}$ and $10^{-13}$ S/cm. Differential Scanning calorimetry revealed a relatively high glass transition temperature of 160° C. The relatively high glass transition temperature delays the onset of plastic flow in the material at the same temperatures as compared to other polymers with lower glass temperatures. Since the disclosed material does not flow as easily at elevated temperatures it may provide increased protection from contact between opposing electrodes of an electrochemical cell during a thermal runaway event. Thus, the polymers described herein may provide improved safety with regards to shorting of an electrochemical cell during a thermal runaway event. Without wishing to be bound by theory, and elevated glass transition temperature may also impart improved mechanical strength to the polymer and reduce movement of the materials within the battery when it is heated during manufacture and use.

Example 2

In a prophetic example, diethylene glycol divinyl ether and N-triethylene glycol maleimide comonomers may undergo a copolymerization reaction. Without wishing to be bound by theory, it is expected that the conductivity of such a combination may be higher, as compared to the currently disclosed results of Example 1, due to higher amounts of polyethylene glycol units and relatively high flexibility of the chains. It is expected that dry state conductivities may be approximately 2-3 orders of magnitude higher than the currently disclosed results of Example 1, e.g., $10^{-6}$ S/cm up to $10^{-5}$ S/cm.

Example 3

This example shows the polymerization of comonomers triethylene glycol divinyl ether and N-phenyl maleimide. Testing was conducted to determine the gel state conductivity of the resulting polymer.

A solution of 20.23 g triethylene glycol divinyl ether and 17.32 g N-phenyl maleimide was dissolved in 38 g MEK together with 0.75 g Irgacure 819 and 2.63 g of the electrolyte solution. The electrolyte solution contained one part 1,3-dioxolane (DOL) and one part dimethoxyethane (DME)

with 8-16% LiTFSI, 2-8% LiNO3, 0-1% guanidinium nitrate and 0-0.4% pyridinium nitrate. The solution was cast onto a copper substrate via doctor blading for determination of gel state conductivities. Other possible substrates include, but are not limited to, lithium and nickel. The coated substrate was quickly transferred into a belt conveyor where it was cured by UV light from a broad band mercury lamp which provided a dose of 2500 mJ/cm$^2$ over a duration of approximately 20 seconds. The polymer film was carefully dried in an oven under vacuum at approximately 80° C. for approximately one hour to remove excess solvent and/or water. Alternatively, the polymer film could have been dried in a dry room at room temperature. The actual electrochemical performance was evaluated in a pouch cell set-up. Once the cells were manufactured the pouch cells were filled with electrolyte and allowed to rest over night to allow for equilibration. The resulting gel state ionic conductivity of the resulting cell was determined to be on the order of $10^{-4}$ S/cm.

Example 4

In a prophetic example, a PEGylated maleimide monomer may be combined with a PEGylated vinyl ether. The combined monomer and comonomer may subsequently undergo a copolymerization reaction. Without wishing to be bound by theory, it is believed that such a polymer may provide optimum conductivities of approximately $10^{-4}$ up to approximately $10^{-3}$. The polymer is expected to provide the above noted conductivities because experiments with triethyleneglycol-divinylether (TEGDVE) including acrylamide as a monofunctional monomer have given gel conductivities as high as $10^{-3}$ S/cm. Without wishing to be bound by theory, it was observed that the ethoxylate chain of the olefin provided the elevated ionic conductivity regardless of the specific monofunctional monomer utilized during testing. Additionally, the alkyl chain and maleimide moiety allow for more ionic conductivity due to more flexible chain movement resulting in higher movement of Li ions. Therefore, the elevated conductivities noted above are expected for the proposed combination of a PEGylated maleimide monomer with a PEGylated vinyl ether. In addition to the above, the combination of PEGylated maleimide and PEGylated vinyl ether may also result in a beneficial balance of material stiffness versus ion conductivity.

Example 5

This example shows the polymerization of comonomers triethylene glycol divinyl ether, maleic anhydride, and N-phenyl maleimide. The maleic anhydride was added to tether the resulting polymer to a substrate.

A solution of 10.12 g triethylene glycol divinyl ether, 0.30 g maleic anhydride, and 8.79 g N-phenyl maleimide was dissolved in 19 g MEK together with 0.37 g Irgacure 819 and 1.41 g of the electrolyte solution. Without wishing to be bound by theory, it is believed that the maleic anhydride may act as a tether to attach the resulting polymer film to an underlying metallic substrate. The electrolyte solution contained one part 1,3-dioxolane (DOL) and one part dimethoxyethane (DME) with 8-16% LiTFSI, 2-8% LiNO3, 0-1% guanidinium nitrate and 0-0.4% pyridinium nitrate. The solution was cast onto a nickel metal substrate via doctor blading for determination of gel state conductivities. The coated substrate was quickly transferred into a belt conveyor where it was cured by UV light from a broad band mercury lamp which provided a dose of 2500 mJ/cm$^2$ over a duration of approximately a 20 seconds. The polymer film was carefully dried in an oven under vacuum at 80° C. for one hour.

The actual electrochemical performance was evaluated in a pouch cell set-up. Once the cells were manufactured the electrolyte was filled into the pouch cell. The cells rested over night to allow for equilibration. The resulting film was mechanically stable on metal substrates like nickel, i.e., it did not detach from the surface. By this approach it was possible to realize a stable film on a nickel anode and successfully suppress dewetting. The ionic conductivities in the gel state and tethered to an underlying substrate were in the range of $10^{-5}$ to $10^{-4}$ S/cm.

Example 6

A solution of 0.85 g 1,4-cyclohexanedimethanoldivinylether, 1.46 g N-phenylmaleimide, 0.19 g LiTFSI, and 0.0231 g 1819 was dissolved in 2.31 g DOL. The system was degassed using a vacuum pump before being coated on copper foil using a MR15. Utilizing a conveyor belt, the coating was passed under the UV light of a broad spectrum mercury lamp with an exposure of 2.2-20.3 mJ/second. Coatings were allowed to dry for 20-60 minutes at room temperature in a dry room. The sample was evaluated for gel conductivity in the form of a small flat cell filled with electrolyte composed of 8-16% LiTFSI, 2-8% LiNO$_3$, 0-1% guanidinium nitrate and 0-0.4% pyridinium nitrate. The gel conductivity of this sample was $2.7 \times 10^{-4}$ S/cm.

Example 7

A solution of 0.77-0.90 g triethylene glycol divinyl ether or 1,4-cyclohexanedimethanoldivinylether, 1.54-1.46 g N-phenylmaleimide, 0.19 g LiTFSI, and 0.0231 g 1819 was dissolved in 2.31 g dioxane. The system was degassed using a vacuum pump before being coated on copper foil using a MR15. Utilizing a conveyor belt, the coating was passed under the UV light of a broad spectrum mercury lamp with an exposure of 2.2-20.3 mJ/second. Coatings were allowed to dry for 20-60 minutes at room temperature in a dry room. The sample was evaluated for gel conductivity in the form of a small flat cell filled with electrolyte composed of 8-16% LiTFSI, 2-8% LiNO3, 0-1% guanidinium nitrate and 0-0.4% pyridinium nitrate. The gel conductivity of these samples were on the order of magnitude of $10^{-4}$ S/cm.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed.

The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of t and an the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for forming a component for use in an electrochemical cell, the method comprising:
    providing an electroactive layer;
    depositing onto a surface of the electroactive layer:
    a) an olefinic monomer comprising a maleimide which includes at least one double bond and at least one electron withdrawing group and at least one olefinic comonomer, different than the olefinic monomer, comprising at least one double bond and at least one electron donating group; or
    b) an olefinic monomer comprising a maleimide which includes at least one double bond and at least one electron withdrawing group, the olefinic monomer further comprising at least one additional double bond and at least one electron donating group, and at least one olefinic comonomer, different than the olefinic monomer;
    polymerizing the monomer(s) using a free radical mechanism to form a polymer;
    wherein the polymer includes structural units comprising the at least one electron withdrawing group that alternate with structural units comprising the at least one electron donating group;
    wherein the electron withdrawing group is selected from the group consisting of $CON(R_1)_2$ and $—CONR_1H$;
    wherein two electron withdrawing groups attached in the 1,2-position to the double bond may form together with the double bond of a 5- to 6-membered substituted or unsubstituted, unsaturated cycle or heterocycle;
    wherein $R_1$ may be linked to at least one further electron donating or electron withdrawing group;
    wherein each occurrence of $R_1$ is independently selected from the group consisting of hydrogen; halogen; substituted or unsubstituted, branched or unbranched acyl; substituted or unsubstituted aryl; substituted or unsubstituted heteroaryl; a metal ion, and a lithium-containing group; and
    wherein a gel state ion conductivity of the polymer is greater than or equal to $10^{-4}$ S/cm.

2. A method as in claim 1, wherein the comonomer comprising the at least one electron donating group comprises a vinyl ether.

3. A method as in claim 1, wherein depositing the olefinic monomer and the olefinic comonomer of a), or depositing the olefinic monomer of b), comprises using at least one of doctor blading, spray coating, spin coating, solution casting, and vapor deposition.

4. A method as in claim 1, wherein depositing the olefinic monomer and the olefinic comonomer of a), or depositing the olefinic monomer of b), comprises using flash evaporation.

5. A method as in claim 1, wherein polymerizing comprises applying at least one of UV light, an electron beam, or thermal energy to the olefinic monomer and olefinic comonomer, or to the olefinic monomer having at least two double bonds, to activate the free radical mechanism.

6. A method as in claim 1, wherein polymerizing the monomers occurs within less than or equal to 5 seconds.

7. A method as in claim 1, further comprising forming an ion conductive layer on the electroactive layer.

8. A method as in claim 7, wherein the ion conductive layer is positioned between the electroactive layer and the layer comprising the polymer.

9. A method as in claim 7, comprising depositing the monomer and the comonomer on a surface of the ion conductive layer.

10. A method as in claim 1 wherein the electron donating group comprises at least one group selected from the group consisting of an alkylamino, a heteroaryl, a cycloalkyl, a cycloalkenyl, a cycloalkynyl, —$OCOR_2$, —$NR_2COR_2$, —$OR_2$, —$SR_2$, —$Si(OR_2)_3$, —$Si(OR_2)_2H$, —$Si(OR_2)H_2$, —$Si(R_2)_3$, —$Si(R_2)_2H$, —$Si(R_2)H_2$,

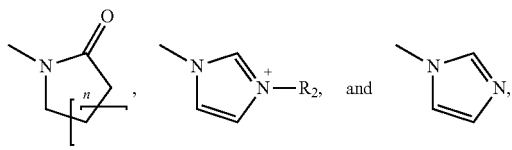

and wherein each occurrence of $R_2$ is independently selected from the group consisting of hydrogen; substituted or unsubstituted, branched or unbranched aliphatic; substituted or unsubstituted cyclic; substituted or unsubstituted, branched or unbranched acyclic; substituted or unsubstituted, branched or unbranched heteroaliphatic; substituted or unsubstituted, branched or unbranched acyl; substituted or unsubstituted aryl; substituted or unsubstituted heteroaryl; substituted or unsubstituted, branched or unbranched alkylene oxide or poly(alkylene oxide); a metal ion; an anionic group; and a lithium-containing group;

wherein n is 1, 2 or 3; and wherein $R_2$ may optionally be linked to at least one further electron donating or electron withdrawing group attached to an olefinic double bond.

11. A method as in claim 1, wherein a molar ratio of the olefinic monomer comprising at least one electron withdrawing group to the at least one olefinic comonomer comprising at least one electron donating group is approximately one to one.

12. A method as in claim 1, wherein a molar ratio of double bonds attached to the olefinic monomer comprising at least one electron withdrawing group to double bonds attached to the at least one olefinic comonomer comprising at least one electron donating group is approximately one to one.

13. A method as in claim 1, wherein the electron withdrawing group is attached to a double bond.

14. A method as in claim 13, wherein the electron donating group is attached to a double bond.

15. A method as in claim 1, wherein $R_1$ may be linked to at least one further electron donating or electron withdrawing group attached to an olefinic double bond.

16. A method as in claim 1, wherein the olefinic monomer is N-phenyl maleimide or N-triethylene glycol maleimide, and the olefinic comonomer is diethylene glycol divinyl ether, triethylene glycol divinyl ether, or 1,4-cyclohexanedimethanoldivinylether.

17. A method for forming a component for use in an electrochemical cell, the method comprising:

providing an electroactive layer;

depositing a monomer comprising a maleimide which includes at least one double bond and at least one electron withdrawing group, and a comonomer comprising a vinyl ether, on a surface of the electroactive layer, wherein the comonomer is different than the monomer comprising the maleimide;

wherein the electron withdrawing group is selected from the group consisting of $CON(R_1)_2$ and —$CONR_1H$;

wherein two electron withdrawing groups attached in the 1,2-position to the double bond may form together with the double bond of a 5- to 6-membered substituted or unsubstituted, unsaturated cycle or heterocycle;

wherein $R_1$ may be linked to at least one further electron donating or electron withdrawing group; and wherein each occurrence of $R_1$ is independently selected from the group consisting of hydrogen; halogen; substituted or unsubstituted, branched or unbranched acyl; substituted or unsubstituted aryl; substituted or unsubstituted heteroaryl; a metal ion, and a lithium-containing group; and polymerizing the monomer and comonomer using a free radical mechanism to form a polymer, wherein the polymer includes structural units comprising the at least one electron withdrawing group that alternate with structural units comprising at least one electron donating group, wherein a gel state ion conductivity of the polymer is greater than or equal to $10^{-4}$ S/cm.

18. A method as in claim 17, wherein the electron withdrawing group is attached to a double bond.

19. A method as in claim 18, wherein $R_1$ may be linked to at least one further electron donating or electron withdrawing group attached to an olefinic double bond.

20. A method as in claim 17, wherein the olefinic monomer is N-phenyl maleimide or N-triethylene glycol maleimide, and the olefinic comonomer is diethylene glycol divinyl ether, triethylene glycol divinyl ether, or 1,4-cyclohexanedimethanoldivinylether.

* * * * *